(12) United States Patent
Hunstable et al.

(10) Patent No.: US 11,784,529 B2
(45) Date of Patent: Oct. 10, 2023

(54) TORQUE TUNNEL HALBACH ARRAY ELECTRIC MACHINE

(71) Applicant: Linear Labs, Inc., Granbury, TX (US)

(72) Inventors: Fred E. Hunstable, Granbury, TX (US); Michael Van Steenburg, Granbury, TX (US); Andrei V. Popov, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

(21) Appl. No.: 17/979,615

(22) Filed: Nov. 2, 2022

(65) Prior Publication Data
US 2023/0054909 A1    Feb. 23, 2023

Related U.S. Application Data

(63) Continuation of application No. 17/003,855, filed on Aug. 26, 2020, now Pat. No. 11,532,963.
(Continued)

(51) Int. Cl.
| | |
|---|---|
| *H02K 21/12* | (2006.01) |
| *H02K 3/47* | (2006.01) |
| *H02K 1/27* | (2022.01) |
| *H02K 16/02* | (2006.01) |
| *H02K 11/30* | (2016.01) |
| *H02K 3/52* | (2006.01) |
| *H02K 15/00* | (2006.01) |

(Continued)

(52) U.S. Cl.
CPC ............... *H02K 3/47* (2013.01); *H02K 1/27* (2013.01); *H02K 3/522* (2013.01); *H02K 11/30* (2016.01); *H02K 15/0062* (2013.01); *H02K 15/095* (2013.01); *H02K 16/02* (2013.01); *H02K 21/12* (2013.01); *H02K 21/145* (2013.01); *H02K 2201/12* (2013.01); *H02K 2203/12* (2013.01); *H02K 2211/03* (2013.01)

(58) Field of Classification Search
CPC ............ H02K 1/18; H02K 1/02; H02K 1/146; H02K 15/0062; H02K 1/27; H02K 11/30; H02K 21/12; H02K 21/145; H02K 15/095; H02K 3/522; H02K 11/33; H02K 16/02; H02K 3/47
See application file for complete search history.

(56) References Cited

U.S. PATENT DOCUMENTS

| | | | |
|---|---|---|---|
| 6,891,306 B1 * | 5/2005 | Soghomonian | .......... H02K 1/27 |
| | | | 310/266 |
| 2008/0278020 A1 * | 11/2008 | Ley | ....................... H02K 21/222 |
| | | | 310/156.01 |

* cited by examiner

*Primary Examiner* — Leda T Pham
(74) *Attorney, Agent, or Firm* — Run8 Patent Group, LLC; Peter Miller; Alexander Rodriguez

(57) ABSTRACT

Disclosed are various embodiments for Torque Tunnel Halbach Array electric machines having a rotor comprising a plurality of rotor assemblies configured to form a magnetic torque tunnel having at least a first magnetic pole tunnel segment and a second magnetic pole tunnel segment, each of the rotor assemblies having a plurality of flux shaping Halbach Arrays configured to focus the Flux Density Distribution in the magnetic torque tunnel and a stator having a plurality of coils configured to form a coil winding assembly, the coil winding assembly positioned within the magnetic torque tunnel, such that at least one of the plurality of coils is surrounded by the first magnetic pole tunnel segment or the second magnetic pole tunnel segment, alternatively the rotor may be the coil winding assembly and the stator may be the magnetic torque tunnel.

20 Claims, 23 Drawing Sheets

Related U.S. Application Data

(60) Provisional application No. 62/989,653, filed on Mar. 14, 2020, provisional application No. 62/958,213, filed on Jan. 7, 2020, provisional application No. 62/942,736, filed on Dec. 2, 2019, provisional application No. 62/902,961, filed on Sep. 19, 2019, provisional application No. 62/895,498, filed on Sep. 4, 2019, provisional application No. 62/895,481, filed on Sep. 3, 2019, provisional application No. 62/891,949, filed on Aug. 26, 2019.

(51) Int. Cl.
*H02K 15/095* (2006.01)
*H02K 21/14* (2006.01)

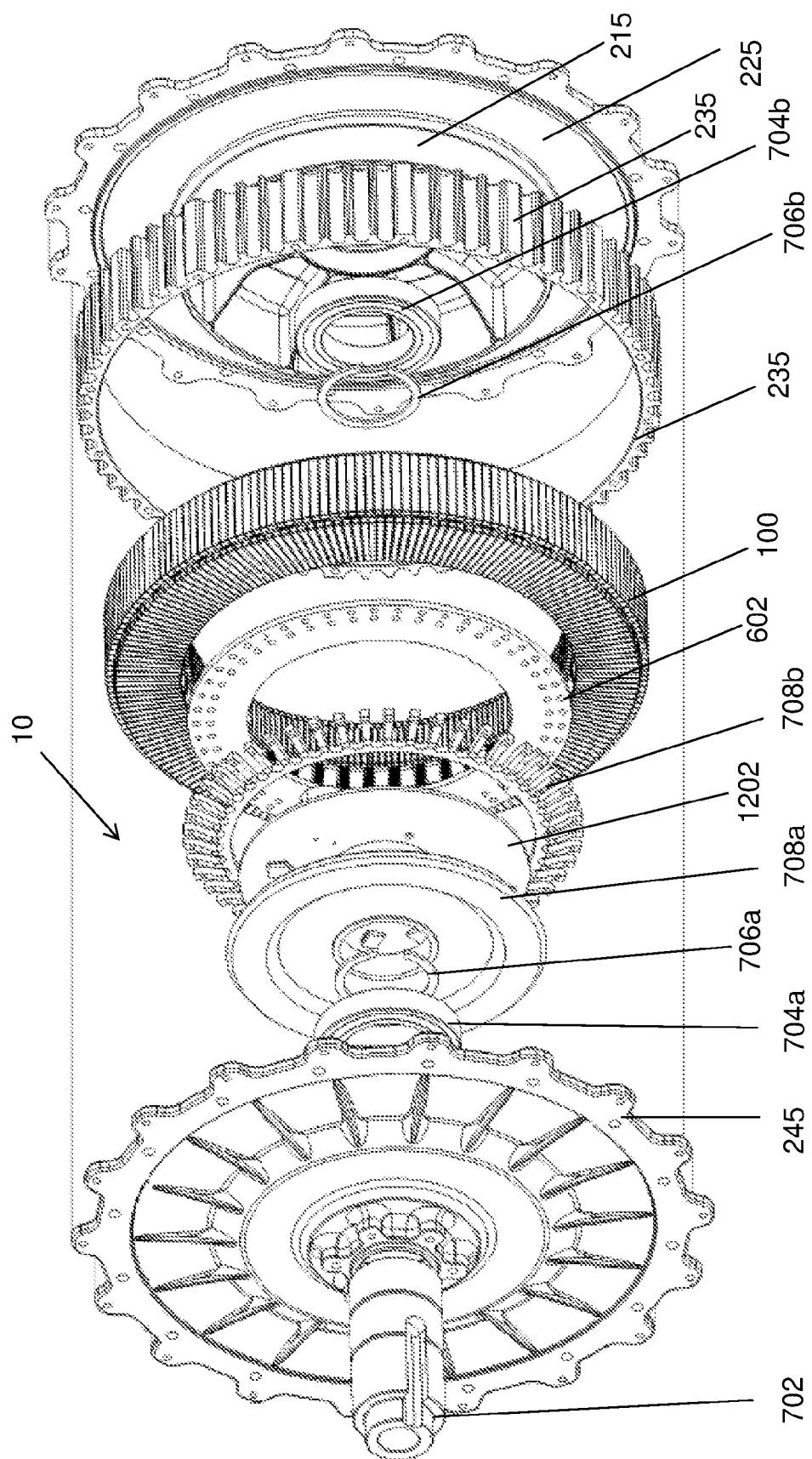
Fig. 1A1

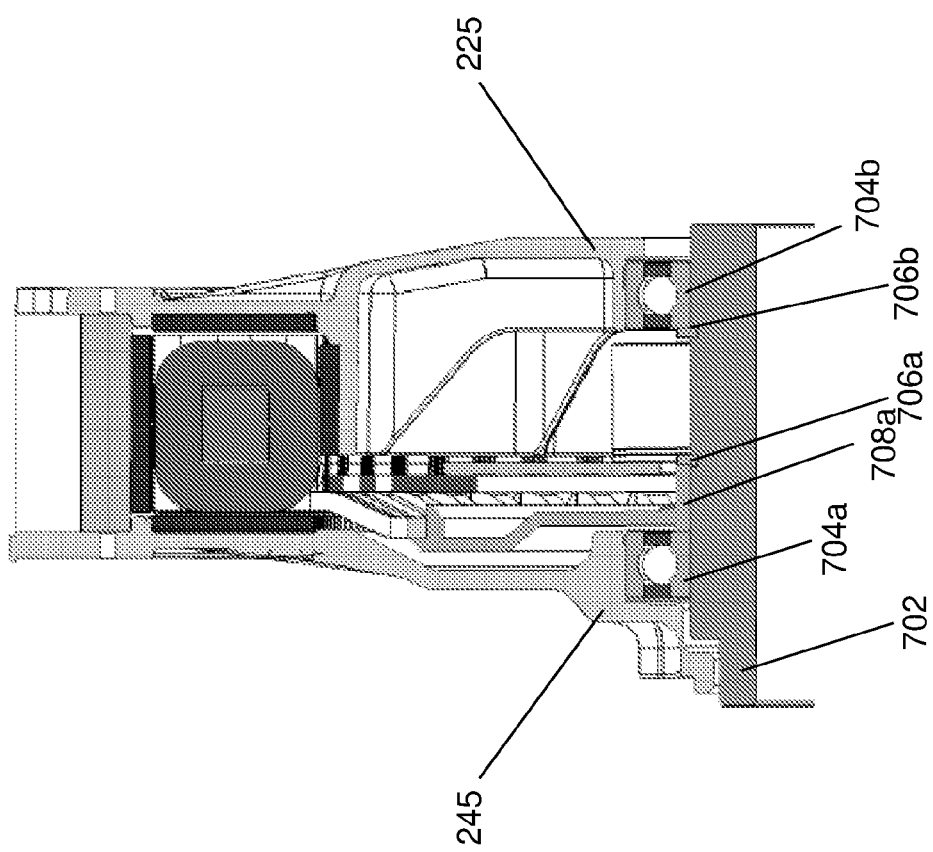

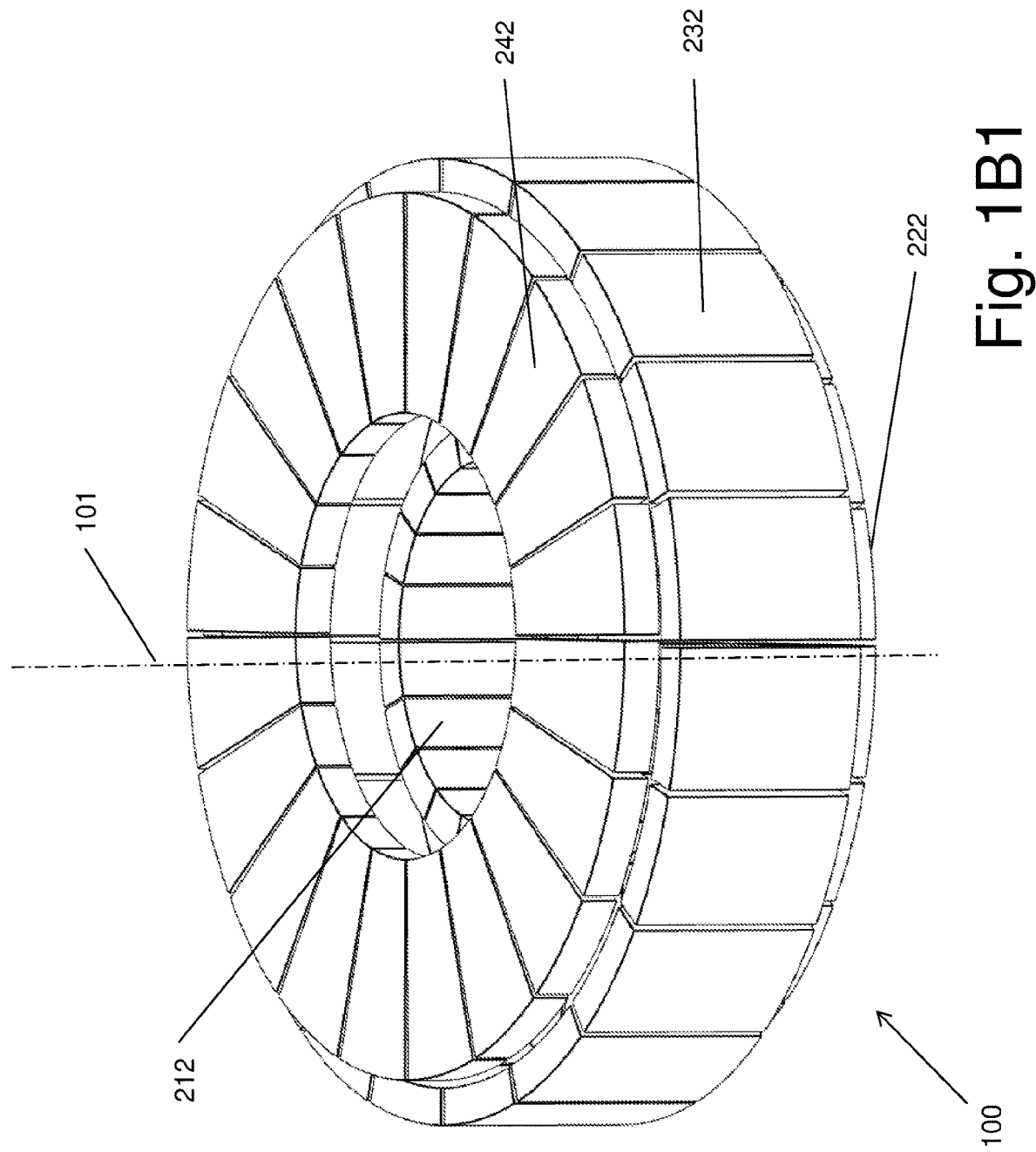
Fig. 1B1

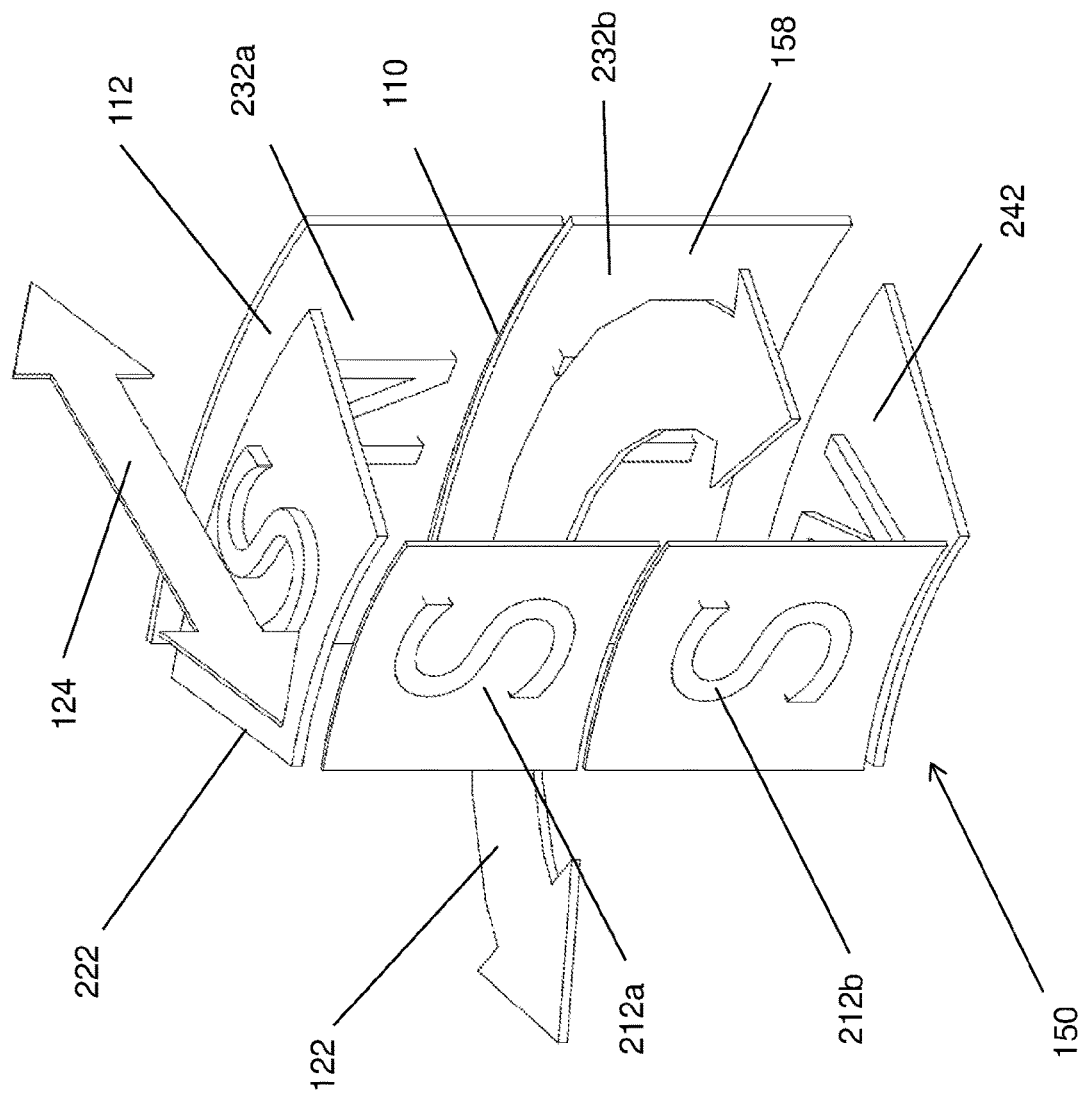

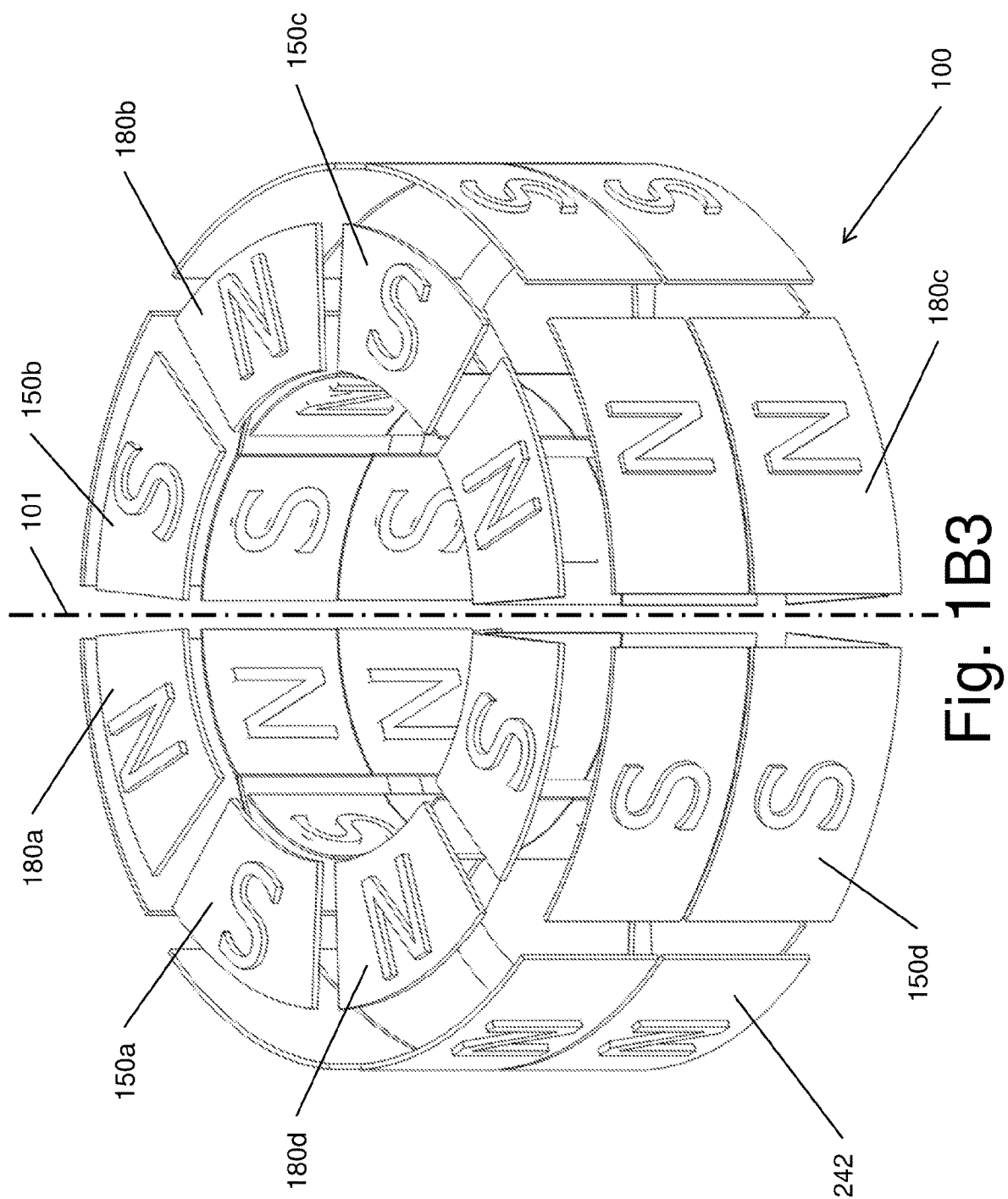
Fig. 1B3

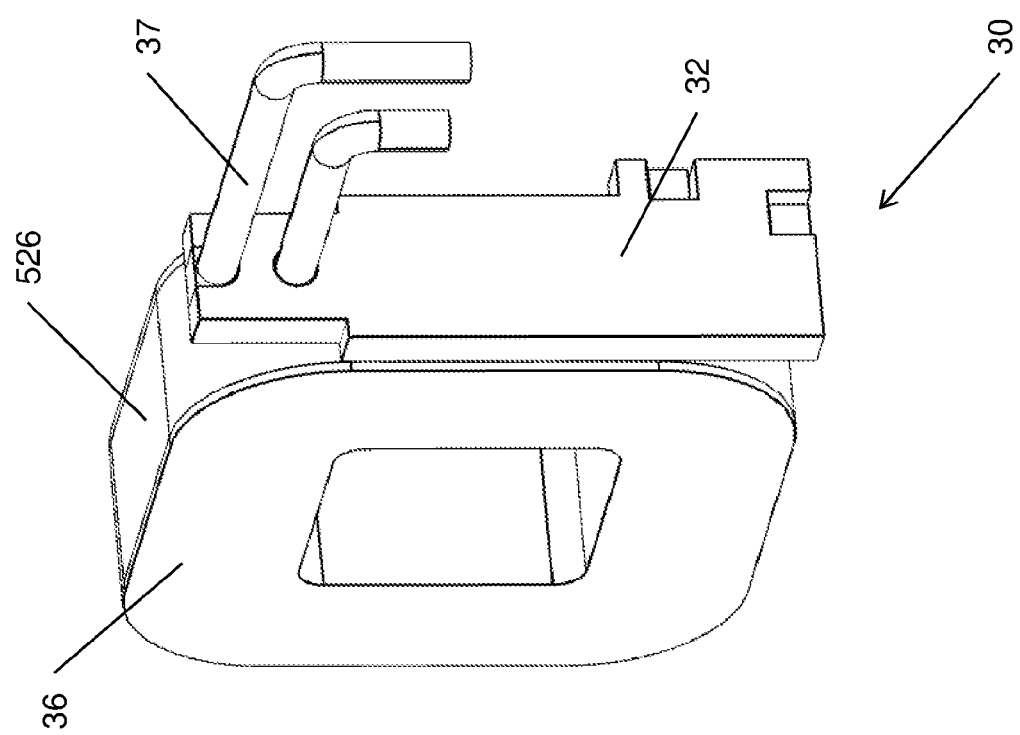

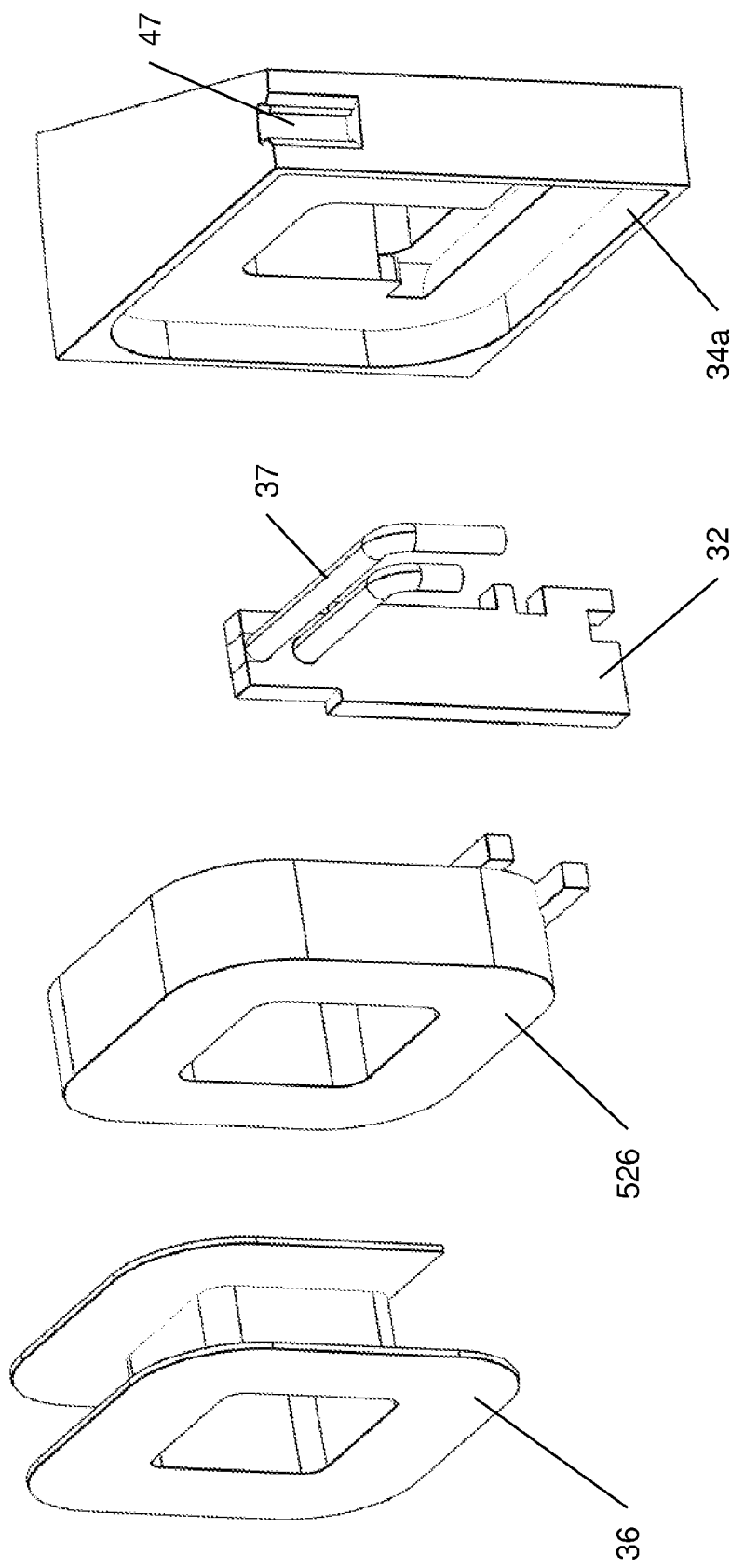
Fig. 1C2

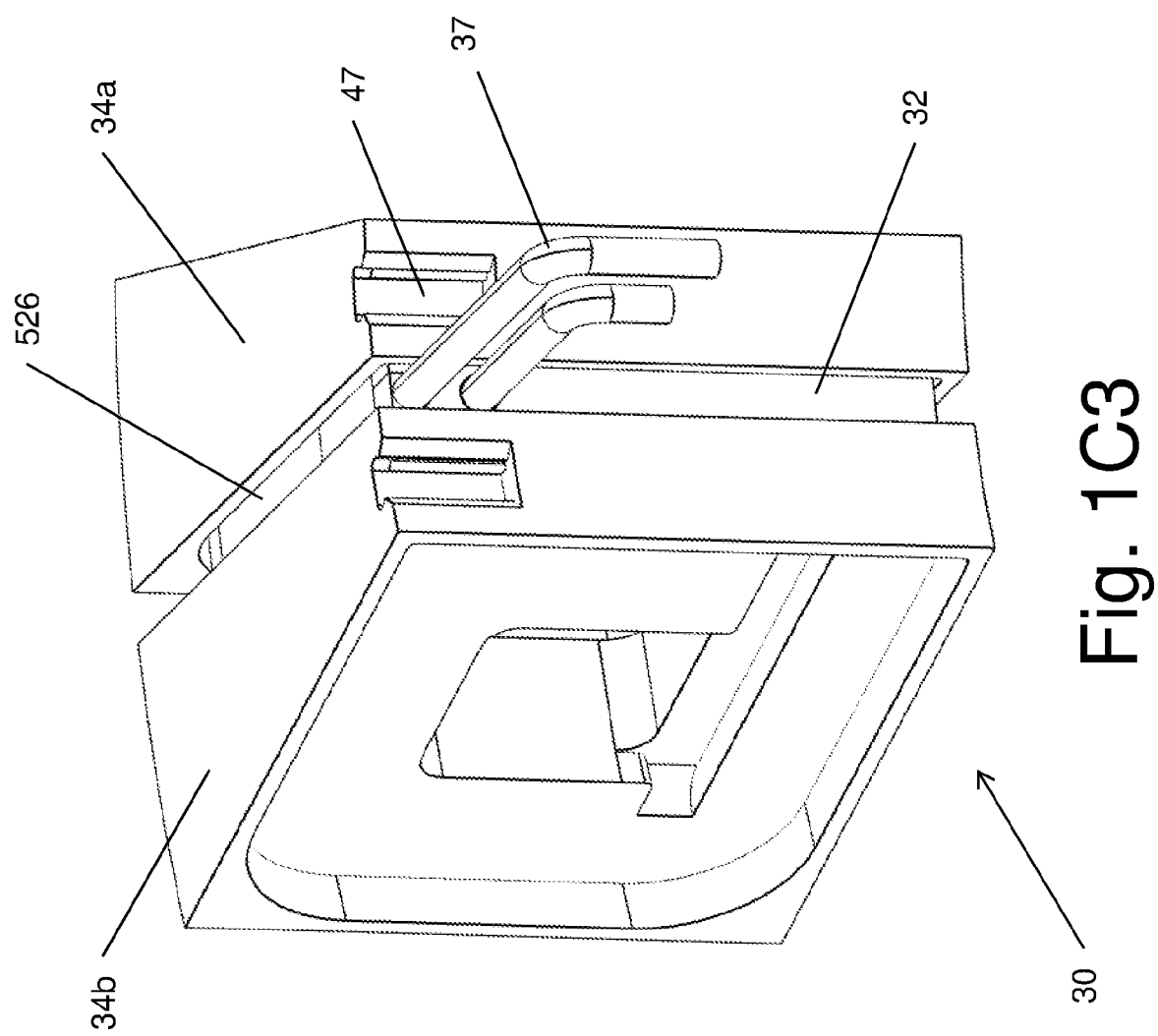
Fig. 1C3

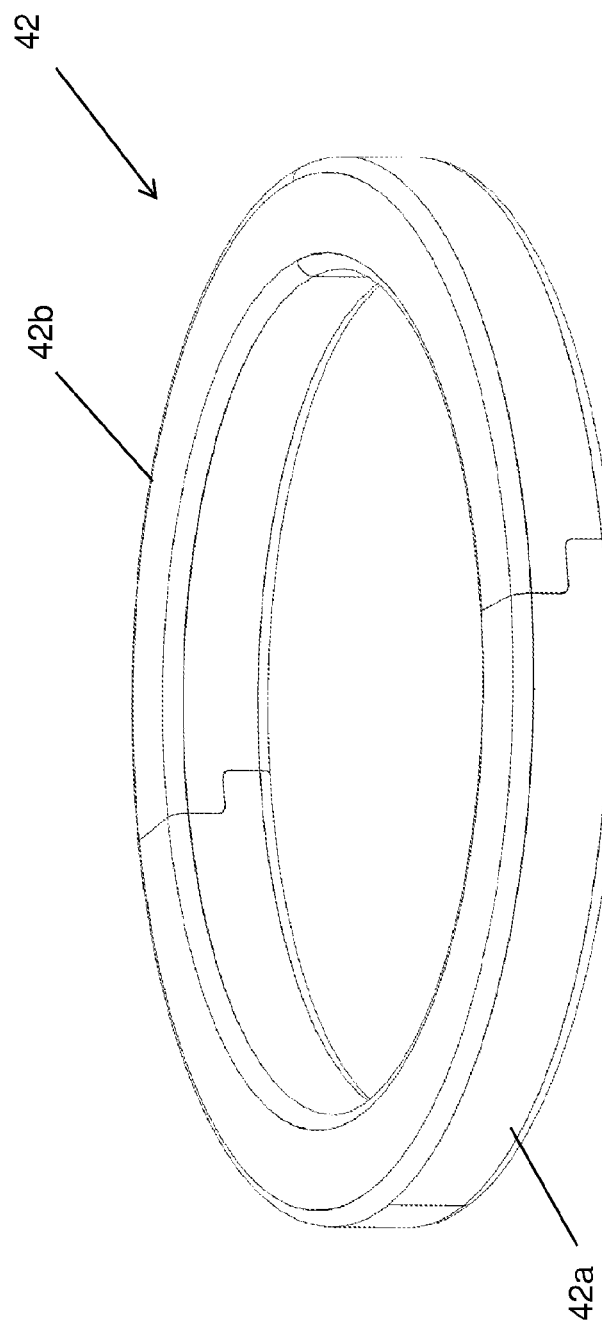
Fig. 1D1

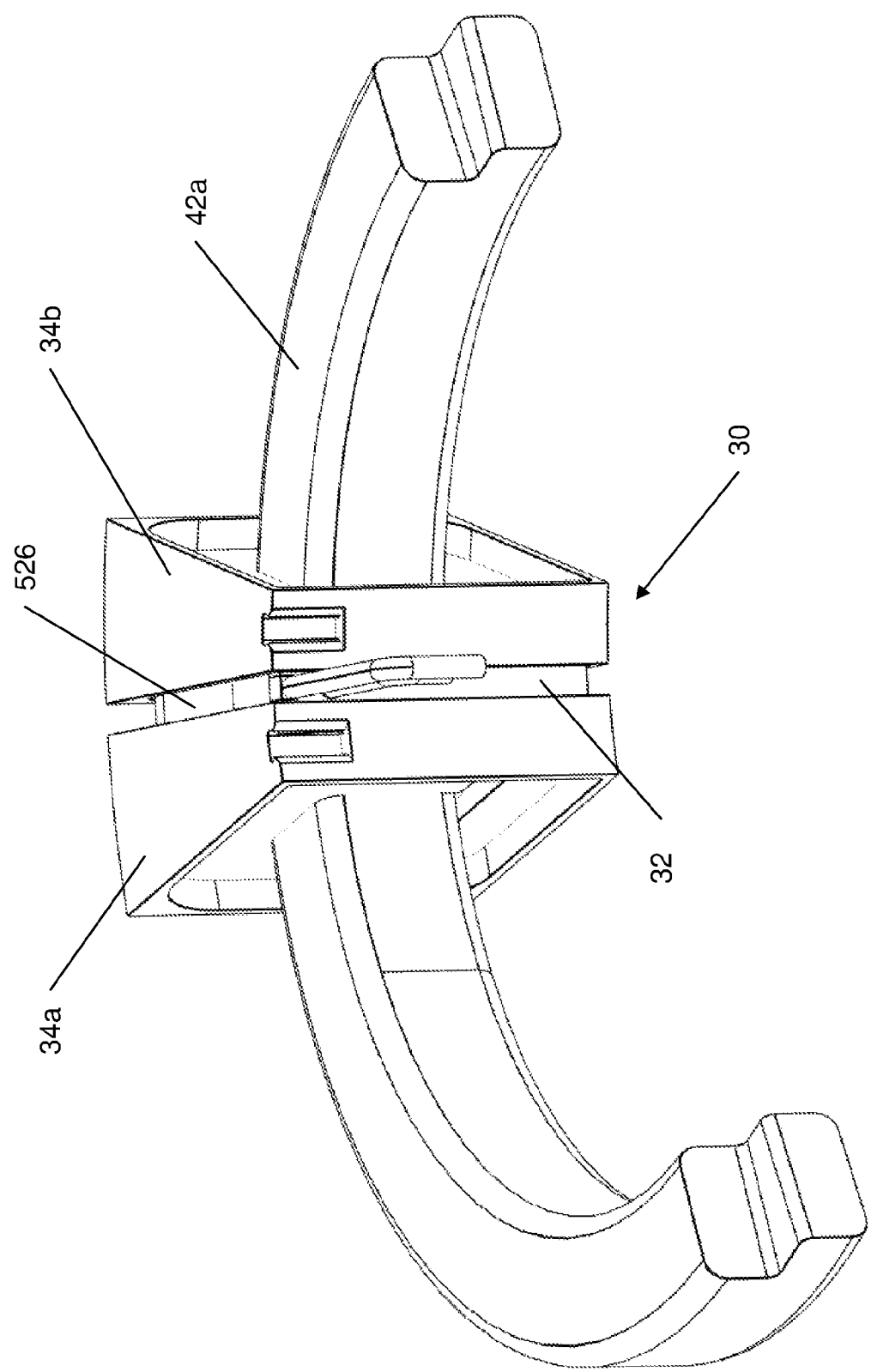

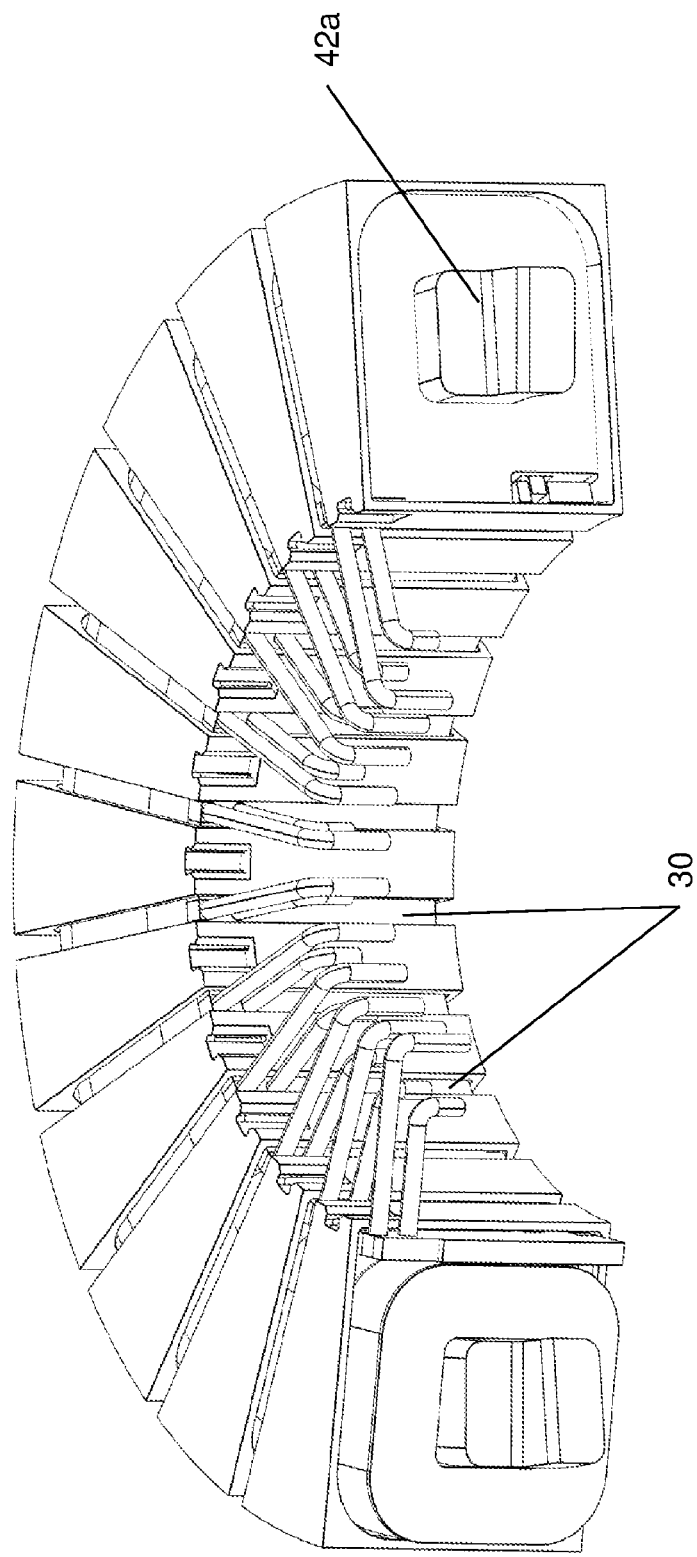
Fig. 1D3

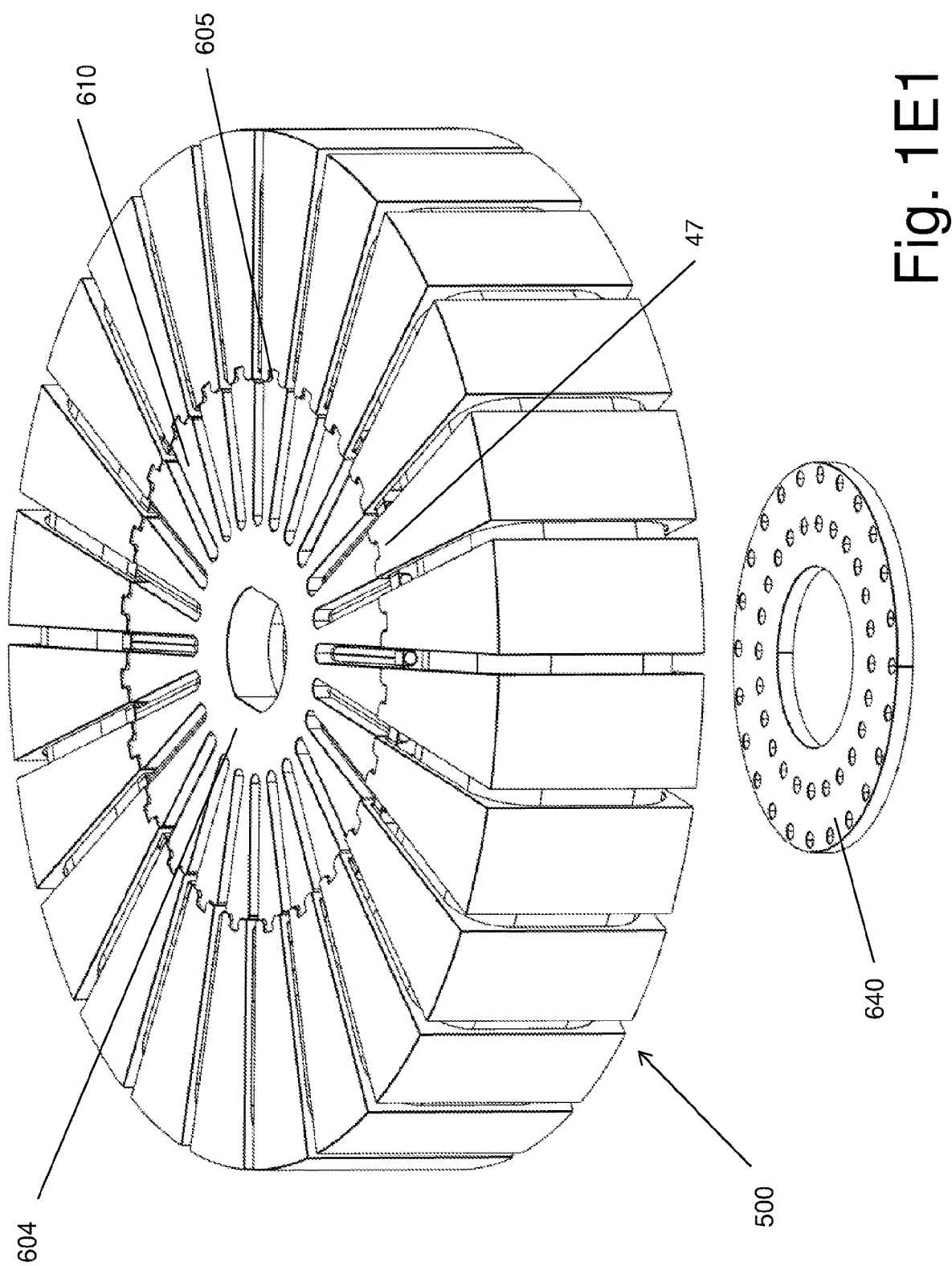
Fig. 1E1

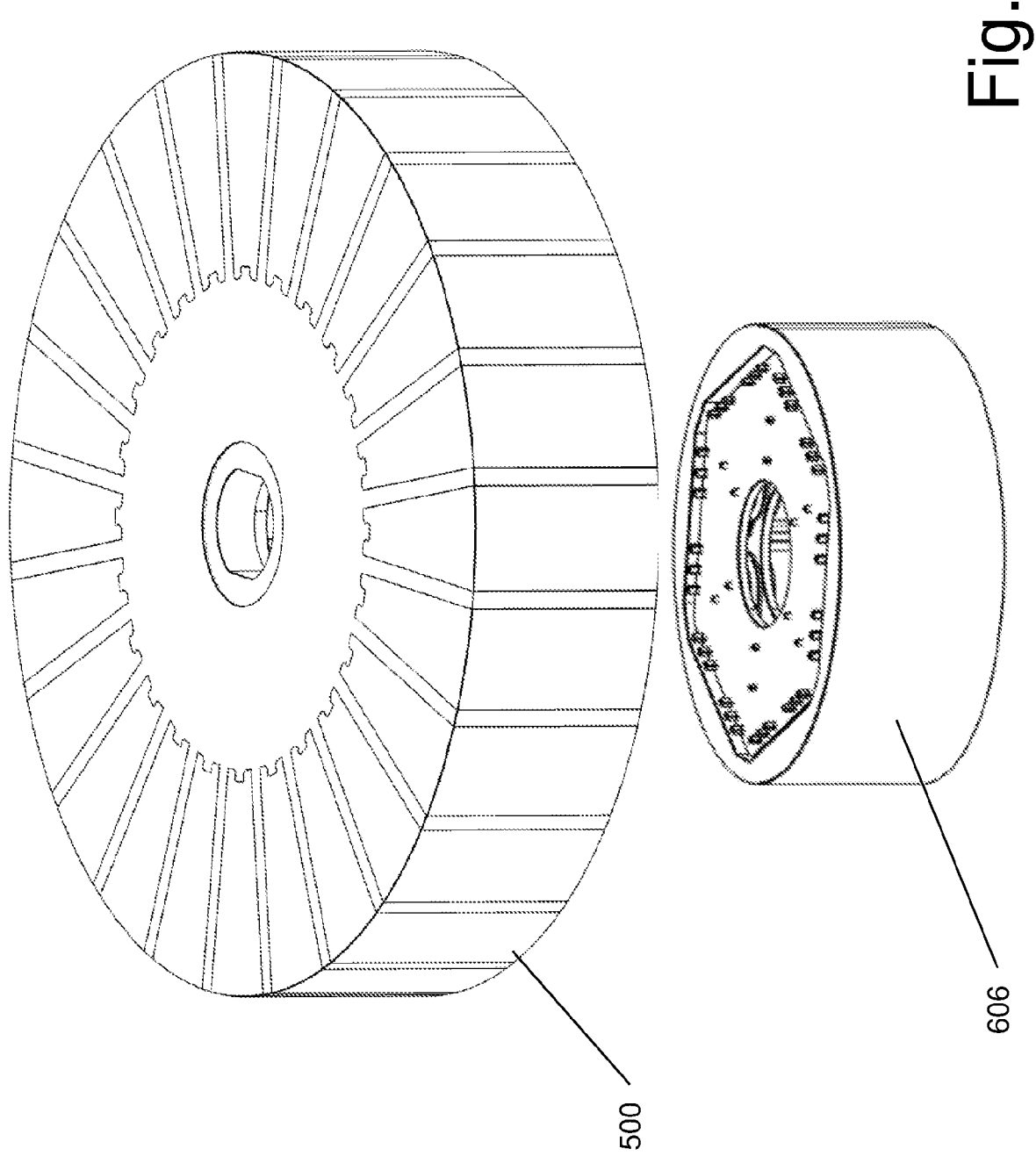
Fig. 1E2

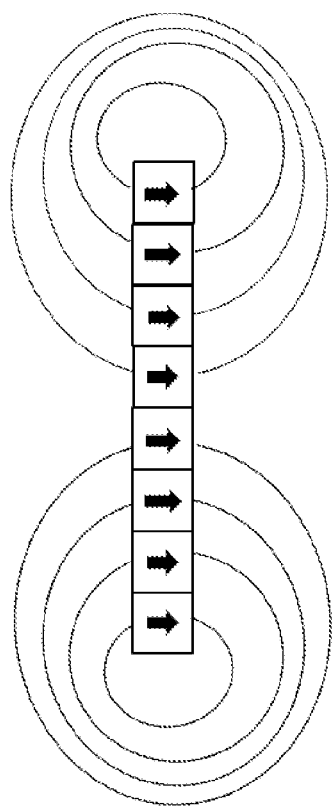
Fig. 1F1
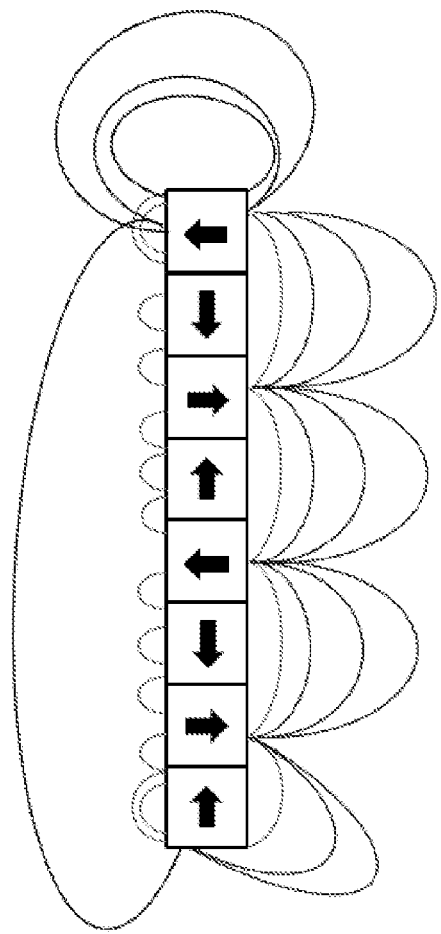
Fig. 1F2

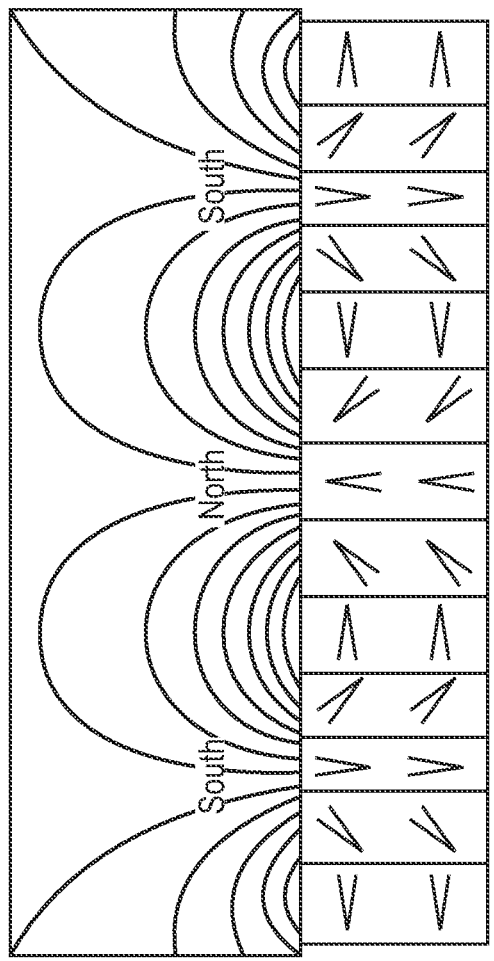
Fig. 1F3
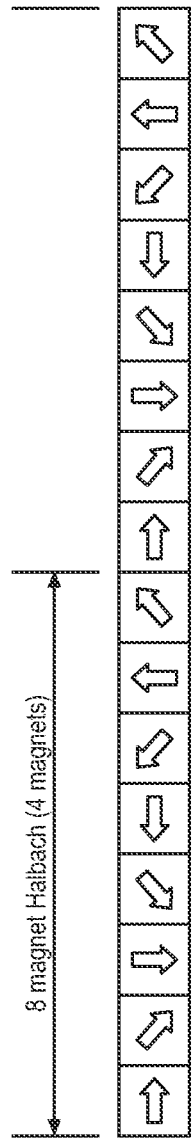
Fig. 1F4

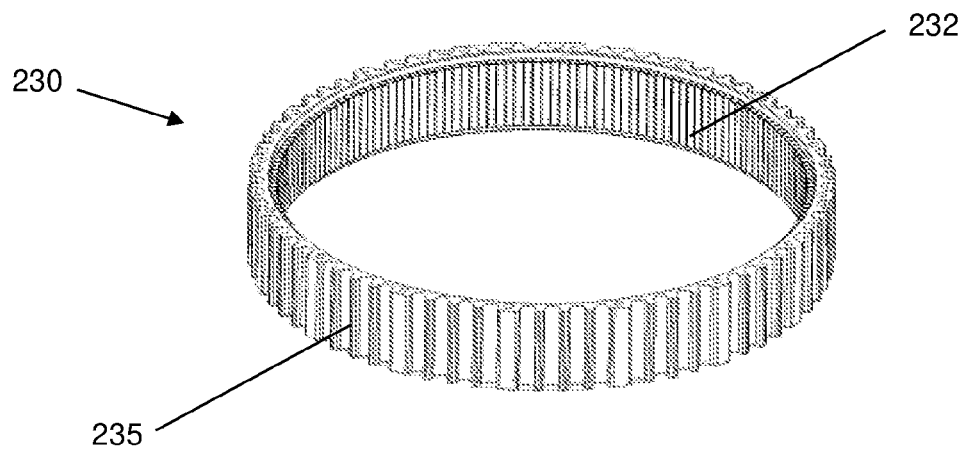
Fig. 2E
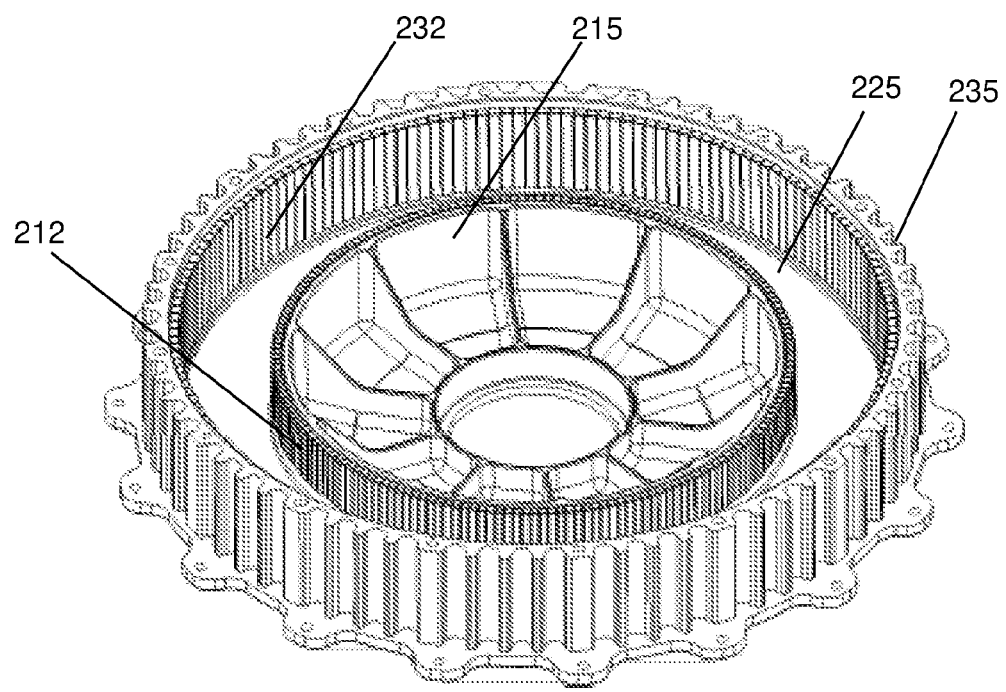
Fig. 2F1

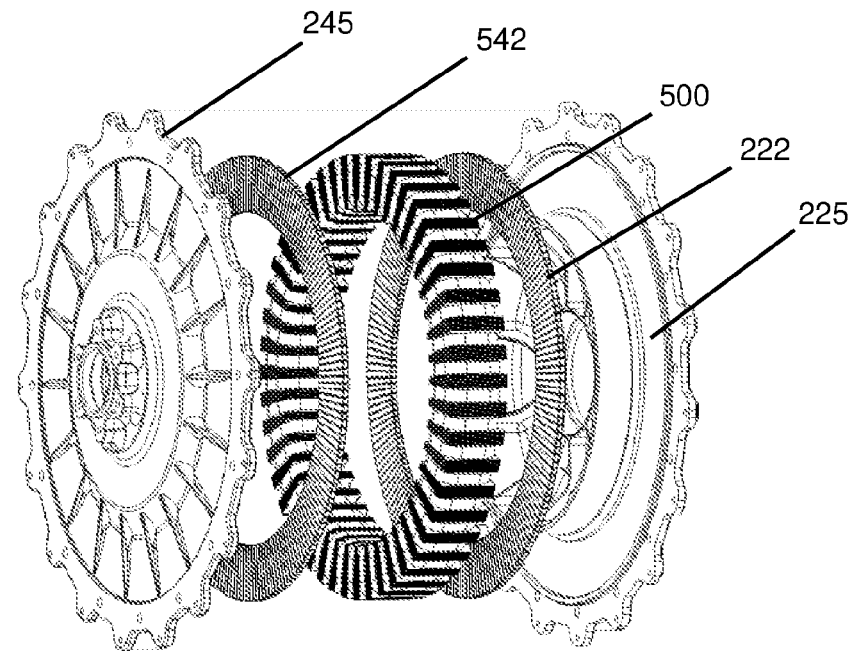
Fig. 2F2
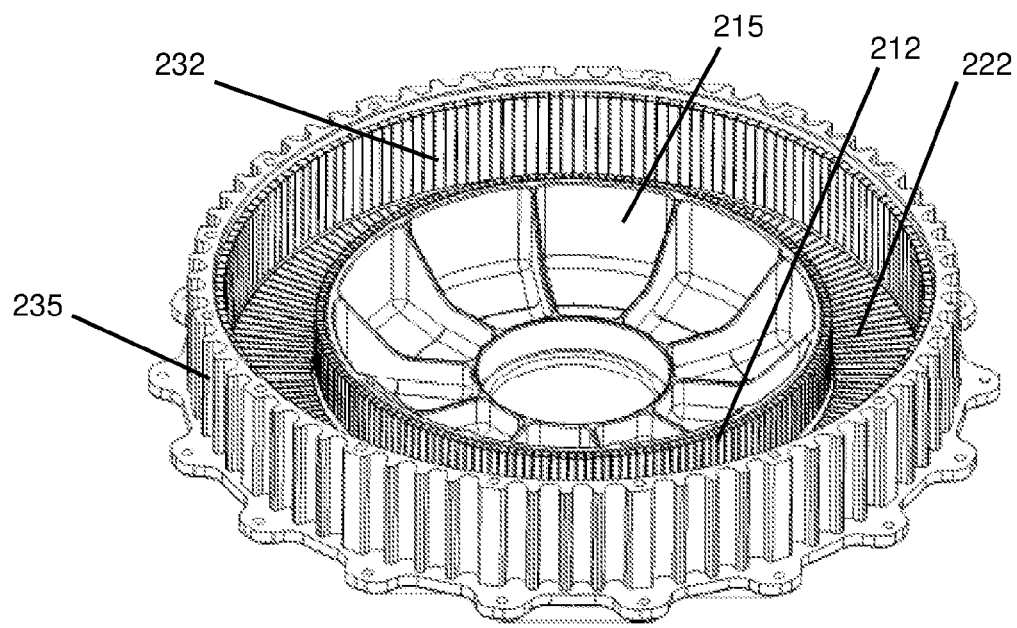
Fig. 2G

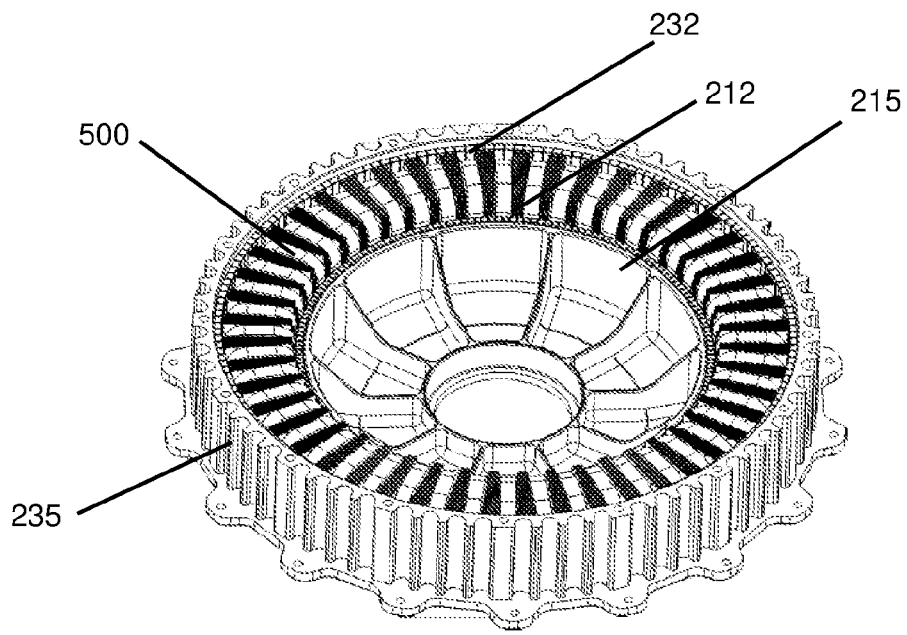
Fig. 2H1
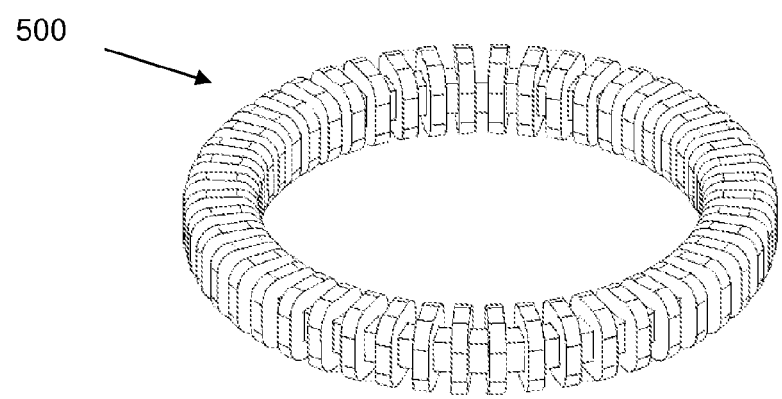
Fig. 2H2

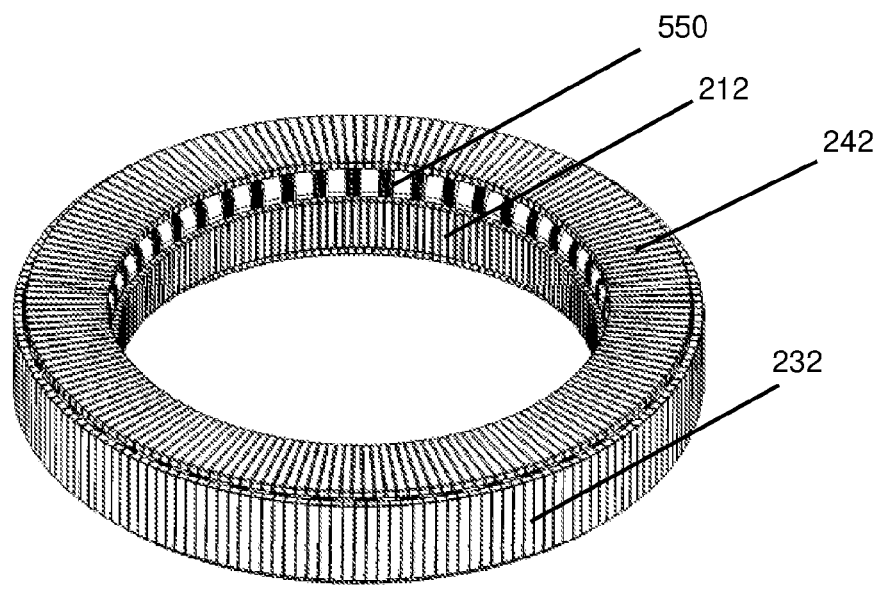
Fig. 2H3
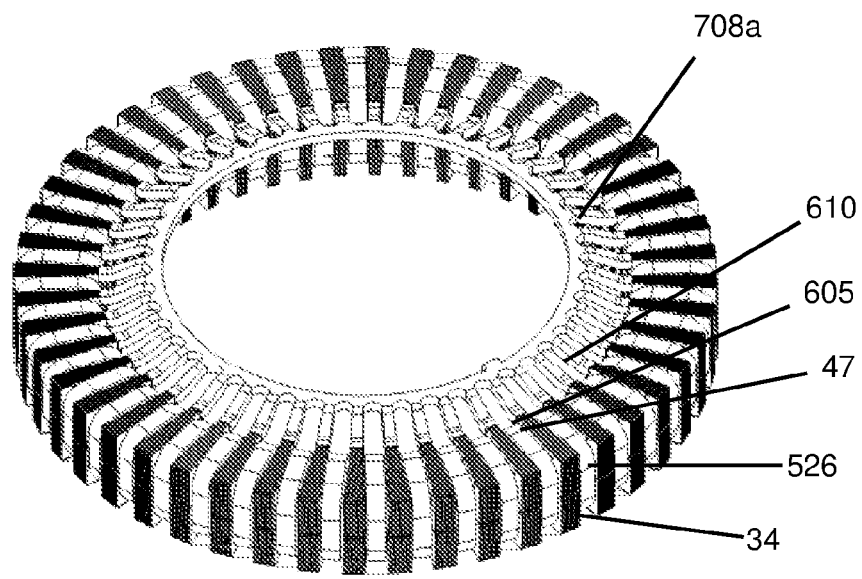
Fig. 2H4

TORQUE TUNNEL HALBACH ARRAY ELECTRIC MACHINE

RELATED APPLICATIONS

This application is a continuation of U.S. Non-Provisional application Ser. No. 17/003,855, entitled "A TORQUE TUNNEL HALBACH ARRAY ELECTRIC MACHINE", filed on Aug. 26, 2020, which is incorporated in its entirety by this reference.

U.S. Non-Provisional application Ser. No. 17/003,855 claims the priority and benefit of the filing date of the following: U.S. provisional application Ser. No. 62/902,961, entitled "AN IMPROVED DISCRETE COIL ELECTRIC MOTOR/GENERATOR." filed on Sep. 19, 2019; U.S. provisional application Ser. No. 62/942,736 entitled "AN IMPROVED DISCRETE COIL ELECTRIC MOTOR/ GENERATOR," filed on Dec. 2, 2019; U.S. provisional application Ser. No. 62/958,213, entitled "AN IMPROVED MULTI-TUNNEL ELECTRIC MACHINE," filed on Jan. 7, 2020; U.S. provisional application 62/989,653, entitled "AN IMPROVED DISCRETE COIL ELECTRIC MOTOR/ GENERATOR," filed on Mar. 14, 2020; U.S. provisional application Ser. No. 62/891,949, entitled "AN IMPROVED HALBACH ARRAY ELECTRIC MOTOR/GENERATOR," filed on Aug. 26, 2019; U.S. provisional application 62/895,481, entitled "AN IMPROVED HALBACH ARRAY ELECTRIC MOTOR/GENERATOR," filed on Sep. 3, 2019; U.S. provisional application Ser. No. 62/895, 498, entitled "AN IMPROVED ELECTRIC MOTOR/GENERATOR," filed on Sep. 4, 2019. The disclosures of which are herein incorporated by reference for all purposes.

TECHNICAL FIELD

The invention relates in general to new and improved electric motors and generators, or electric machines for producing rotary motion or generating electrical power from rotary motion input and in particular, to electric machines using Halbach Arrays with unique arrangement of multiple rotors.

BACKGROUND INFORMATION

Electric motors use electrical energy to produce mechanical energy, typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. In a conventional electric motor, a central core (commonly known as the rotor) of tightly wrapped current carrying material creates magnetic poles which rotate at high speed between the fixed poles of a magnet (commonly known as the stator) when an electric current is applied. The central core is normally coupled to a shaft which rotates with the rotor. The shaft may be used to drive gears and wheels in a rotary machine or convert rotational motion into motion in a straight line. With conventional electric motors a pulsed electrical current of sufficient magnitude must be applied to produce a given torque or horsepower output.

Generators are usually based on the principle of electromagnetic induction, which was discovered by Michael Faraday in 1831. Faraday discovered that when an electrical conducting material, such as coils of copper wire, are moved through a magnetic field, or vice versa, an electric current will begin to flow through that moving conducting material. In this situation, the coils of wire are called the armature, because they are moving with respect to the stationary magnets, which are called the stator. Typically, the moving component is called the rotor or armature and the stationary components are called the stator. The power generated is a function of flux strength, conductor size, number of pole pieces, and motor speed in revolutions per minute (RPM).

In motors or generators, some form of energy drives the rotation of the rotor. As energy becomes scarcer and more expensive, what is needed are more efficient motors and generators to reduce energy consumption and hence reduce costs.

SUMMARY

In response to this and other problems, this patent application is an expansion of previous patents and patent applications that discussed using methods and systems of increasing flux density in electric machines by using Halbach Arrays and multiple rotors to form a magnetic torque tunnel.

These and other features, and advantages, will be more clearly understood from the following detailed description taken in conjunction with the accompanying drawings.

BRIEF DESCRIPTION OF THE DRAWINGS

FIG. 1A1 is an exploded view of one embodiment of an electric machine according to certain aspects of the present disclosure.

FIG. 1A2 is a detailed section view of the embodiment of FIG. 1A1 illustrating various structural components used to position the rotary assembly of the electric machine about a center shaft.

FIG. 1B1 is a detailed isometric view of one embodiment of an assembled magnetic toroidal cylinder or magnetic disk of FIG. 1A1.

FIG. 1B2 is a detailed isometric view illustrating one embodiment of a magnetic tunnel segment of the magnetic toroidal cylinder.

FIG. 1B3 is a detailed view illustrating one embodiment of a magnetic toroidal cylinder showing the magnetic pole orientation of the individual magnetic segments.

FIG. 1C1 is a detailed isometric view of a power or coil module.

FIG. 1C2 is a detailed exploded isometric view of the primary components comprising the coil module of FIG. 1C1.

FIG. 1C3 is an isometric view of a coil module sandwiched between two pole portions.

FIG. 1D1 is an isometric view of a central core or yoke for a coil winding assembly.

FIG. 1D2 is an isometric view of a coil module positioned about a portion of the central core.

FIG. 1D3 is an isometric view of the central core portion of FIG. 1D2 illustrating additional coil modules positioned about the central core portion.

FIG. 1E1 is an isometric view of a coil winding assembly formed by joining the core portion illustrated in FIG. 1D3 with another core portion also having a full complement of coil modules 30 and a spider stator 604.

FIG. 1E2 is an isometric exploded view of the assembled coil module after potting and a brushless motor controller.

FIG. 1F1 illustrates an array of eight magnets having the same orientation and their stand-alone flux field.

FIG. 1F2 illustrates the corresponding stand-alone flux field of a Halbach Array having eight permanent magnets with 90 degrees orientation change between adjacent magnets.

FIG. 1F3 illustrates the corresponding stand-alone flux field of a Halbach Array having eight permanent magnets with 45 degrees orientation change between adjacent magnets.

FIG. 1F4 illustrates the 45-degree orientation change between adjacent magnets for a Halbach Array having eight permanent magnets.

FIG. 2E is an isometric view illustrating an outer rotor assembly of the Torque Tunnel Halbach Array Electric Machine FIG. 2F1 is an isometric view illustrating an Axial Double Rotor Torque Tunnel Halbach Array Electric Machine.

FIG. 2F2 is an isometric view illustrating a Radial Doble Rotor Torque Tunnel Halbach Array Electric Machine.

FIG. 2G is an isometric view illustrating a Torque Tunnel Halbach Array Electric Machine having an outer rotor coupled to an inner rotor.

FIG. 2H1 is an isometric view illustrating the first axial rotor assembly and inner rotor assembly of FIG. 2E coupled to the outer rotor assembly of FIG. 2F.

FIG. 2H2 is an isometric view illustrating an alternative Halbach Array coil winding assembly.

FIG. 2H3 is an isometric view illustrating a transverse slot for a Halbach Array coil winding assembly support frame.

FIG. 2H4 is an isometric view illustrating the support frame or spider stator inner for Halbach Array coil winding assembly.

DETAILED DESCRIPTION

Figure 2A:
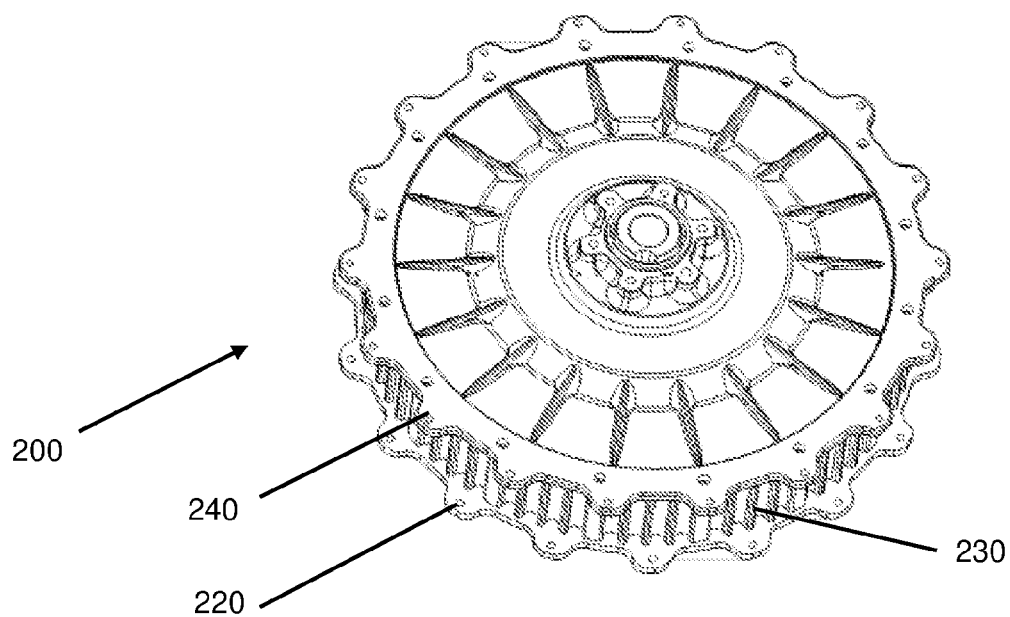
FIG. 2A is an isometric view of one embodiment of a Torque Tunnel Halbach Array Electric Machine (THEM) according to the principles of the present invention.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counterclockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Clarification of Terms

The flow of current through a conductor creates a magnetic field. When a current carrying conductor is placed in a magnetic field the current carrying conductor will experience a force. The force that the current carrying conductor experiences is proportional to the current in the wire and the strength of the magnet field that it is placed in. Further, the force that the current carrying conductor experiences will be greatest when the magnetic field is perpendicular to the conductor. For the purposes of this application "flux current" is defined as the rate of current flow through a given conductor cross-sectional area. In some embodiments described herein the source of the magnetic field may be a current flowing in individual coils of a motor winding. In other embodiments, the source of the magnetic field may be a permanent magnet. The magnetic field associated with the permanent magnetic may be visualized as comprising of a plurality of directional magnetic flux lines surrounding the permanent magnet. The magnetic flux lines, often denoted as $\phi$, or $\phi_B$ are conventionally taken as positively directed from a N pole to a S pole of the permanent magnet. The flux density, often written in bold type as B, in a sectional area A of the magnetic field surrounding the permanent magnet is defined as the magnetic flux $\phi$ divided by the area A and is a vector quantity.

For the purposes of this application permeability is a measure of the ability of a material to support the formation of magnetic field within the material. That is, permeability is the degree of magnetization that the material will obtain in response to an applied magnetic field.

For the purposes of this application an "inductor" is defined as an electrical component that stores energy in a magnetic field when electric current flows through the inductor. Inductors normally consist of an insulated conducting wire wound into a coil around a core of ferromagnetic material like iron. The magnetizing field from the coil will induce magnetization in the ferromagnetic material thereby increasing the magnetic flux. The high permeability of the ferromagnetic core significantly increases the inductance of the coil. In some embodiments described herein the permeability of the ferromagnetic core may increase the inductance of the coil by a factor of about one thousand or more. The inductance of a circuit depends on the geometry of the current path and the magnetic permeability of nearby materials. For instance, winding a copper wire into a coil increases the number of times the magnetic flux lines link the circuit thereby increasing the field and thus the inductance of the circuit. That is, the more coils the higher the inductance. The inductance also depends on other factors, such as, the shape of the coil, the separation of the coils, and the like. Flux linkage occurs when the magnetic flux lines pass through the coil of wire and its magnitude is determined by the number of coils and the flux density.

For the purposes of this application the axis of the rotor pole may be referred to as the direct-axis or d-axis, whereas the axis in quadrature to the rotor pole may be referred to as the quadrature axis or q-axis. The direct axis is the axis in which flux is produced by the field winding. The quadrature axis is the axis on which torque is produced by the field winding. The effect of the armature (stator) flux on the flux produced by the rotor filed is called the armature reaction flux. The armature reaction flux $\phi_{AR}$ has two components, $\phi_d$ along the direct axis and $\phi_q$ along the quadrature axis. In AC motors the salient pole field winding rotates, as does the d-axis and q-axis spatially. By convention, the quadrature axis always leads the direct axis electrically by 90 degrees. The d-axis and q-axis inductances are the inductances measured as the flux path passes through the rotor in relation to the magnetic pole. The d-axis inductance is the inductance measured when flux passes through the magnetic poles. The q-axis inductance is the inductance measure when flux passes between the magnetic poles.

For the purposes of this application the term "excitation current" is the current in the stator winding required to generate magnetic flux in the rotor. Permanent magnet machines do not require an excitation current in the stator winding because the motor's magnets already generate a standing magnetic field. The torque-producing current is the current required to generate motor torque. In a permanent magnet machine, the torque-producing current makes up most of the current draw.

When the current flowing through the inductor changes, the time-varying magnetic field induces an Electromotive Force (emf) (voltage) in the conductor, described by Faraday's law of induction. According to Lenz's law, the induced voltage has a polarity which opposes the change in current that created it. As a result, inductors oppose any changes in current through them. For the purposes of this application the term "back electromotive force" or "back emf" is the voltage that occurs in electric motors when there is a relative motion between the stator windings and the rotor's magnetic field. The geometric properties of the rotor will determine the shape of the back emf waveform. The back emf waveforms may be sinusoidal, trapezoidal, triangular, or a combination thereof. Both induction and Permanent Magnet (PM) motors generate back emf waveforms. In an induction machine, the back-emf waveform will decay as the residual rotor field slowly decays because of the lack of a stator field. However, in PM machine the rotor generates its own magnetic field. Therefore, a voltage can be induced in the stator windings whenever the rotor is in motion. The back emf voltage will rise linearly with speed and is a substantial factor in determining maximum operating speed of an electric motor.

In some embodiments, the Permanent Magnet (PM) motor may be a surface permanent magnet motor (SPM). That is, the permanent magnets are affixed to an exterior surface of the rotor. In other embodiments, the PM motor may be an interior permanent magnet motor (IPM). That is, the permanent magnets are inside or encapsulated by the rotor.

An electric motor's torque comprises of magnetic torque and reluctance torque. Magnetic torque is the torque generated by the interaction between the magnet's flux field and the current in the stator winding. Reluctance torque is the force acting on a ferromagnetic material placed in an external magnetic field that causes the ferromagnetic material to align with the external magnetic field, such that, the reluctance is minimized. That is, reluctance torque is the torque generated by the alignment of the rotor shaft to the stator flux field.

For the purposes of this application the term "magnetic saliency" describes the relationship between the rotor's main flux (d-axis) inductance and the main torque-producing (q-axis) inductance. The magnetic saliency may vary depending on the position of the rotor to the stator field, with maximum saliency occurring at 90 electrical degrees from the main flux axis. A Surface Permanent Magnet (SPM) motor has a near unity saliency ratio. That is, the d-axis inductance is approximately equal to the q-axis inductance regardless of the rotor position, because of this SPM motor designs rely significantly, if not completely, on the magnetic torque component to produce torque.

For purposes of this application the term "back iron" may refer to iron or any ferrous-magnetic compound or alloy, such as stainless steel, any nickel or cobalt alloy, electrical steel, laminated steel, laminated silicon steel, or any laminated metal comprising laminated sheets of such material, or a sintered specialty magnetic powder.

System Overview

FIG. 1A1 is an exploded isometric view of an electric machine 10 comprising a coil winding assembly 500 (not shown) surrounded by a quadruple-rotor assembly including a magnetic toroidal cylinder 100, an inner rotor core 215, a first axial rotor core 225, an outer rotor core 235, and a second axial rotor core 245. The electric machine 10 further including structural components, such as a center shaft or axle 702, a first sealed bearing 704a, a first retaining ring 706a, a second sealed bearing 704b, a second retaining ring 706b, a spider stator inner 708a, and spider stator outer 708b. The electric machine 10 may also include electrical components, such as a brushless motor controller 1202 and a PCB interconnect board 602. Embodiments, of the electric machine 10 are also known as the Hunstable Electric Turbine (HET) or a circumferential flux four rotor electric machine.

The electric machine 10 may also include a back-iron circuit 804, which in some embodiments includes one or more of the rotor cores, 215, 225, 235, and 245. The back-iron circuit 804, while theoretically optional, serves to strengthen magnetic elements as described below and constrain the magnetic circuit to limit reluctance by removing or reducing the return air path.

In some embodiments, the back-iron circuit 804 may be electric steel (magnet steel) that also provides structural integrity due to its high rigidity/stiffness. In other embodiments where the magnetic toroidal cylinder 100 comprises a plurality of Halbach Arrays such heavy materials may not be needed for the rotor cores 215, 225, 235, and 245, although a stiff structure may be required for structural integrity—such as Polyether Ether Ketone (PEEK), aluminum, carbon fiber or the like.

In the embodiment of FIG. 1A1, the coil winding assembly 500 is the stator and the magnetic toroidal cylinder 100 is part of the rotor assembly. Structural components, such as the bearings 704a and 704a, retaining rings 706a and 706b, spider stator inner 708a, and spider stator outer 708b, position and secure the rotor assembly about the center shaft 702, as illustrated in FIG. 1A2.

In other configurations, the coil winding assembly 500 may be a rotor and the magnetic toroidal cylinder 100 may form part of the stator assembly. Further, the illustrated embodiment is only one way of configuring the rotors of the electric machine 10 and supporting the coil winding assembly 500 of the stator. In other embodiments the coil winding assembly 500 may be supported by a support ring (not shown) extending from the coil winding assembly 500 through an outer slot within the outer rotor core 235 and/or defined by a slot between an first end of the outer rotor core 235 and an outer edged of one of the adjacent axial rotor cores 225, 245 to an exterior casing or housing. In yet other embodiments when the coil winding assembly 500 is functioning as a rotor, the coil winding assembly 500 may be supported by a support ring extending from the coil winding assembly 500 through an inner slot within the inner rotor core 215 to the center shaft 702. The exact configuration depends on design choices as to whether the coil winding assembly 500 is to be the stator or the rotor.

Magnetic Toroidal Cylinder

FIG. 1B1 is a detailed isometric view of one embodiment of the assembled magnetic toroidal cylinder 100 or magnetic disk of FIG. 1A1. In the embodiment illustrated in FIG. 1B1, the magnetic toroidal cylinder 100 is centered about a longitudinal axis 101. In certain embodiments, the magnetic toroidal cylinder 100 may include a first axial magnetic wall 222 (also called a side wall or axial wall) and a second or opposing axial magnetic wall 242 positioned a predetermined distance from the first axial magnetic wall 222 along the longitudinal axis 101. An outer radial magnetic wall 232 and an inner radial magnetic wall 212 are generally longitudinally positioned between the first axial magnetic wall 222 and the second axial magnetic wall 242. Each of the magnetic walls 212, 222, 232, and 242 comprising a plurality of permanent magnets position about with uniform angular spacing and coupled to their respective cores (not shown) of a corresponding rotor assembly.

In certain embodiments, the axial magnetic walls 222, 242 and radial magnetic walls 212, 232 may be made of out permanent magnetic material, such as: Neodymium, Alnico alloys, ceramic permanent magnets, electromagnets, Halbach Arrays, or the like.

In some embodiments, each of the plurality of permanent magnets need not be perfectly rectangular, although a substantially rectangular shape may be preferred in some applications. For instance, an arrangement of substantially rectangular permanent magnets may leave corridors between them that can be used as cooling pathways or filled with a heat conductive material, such as aluminum. In the illustrative embodiment of FIG. 1B1 the shape of the magnets is substantially trapezoidal and the number of magnets on the inner magnetic cylinder wall 212 of the inner rotor and the outer magnetic cylinder wall 232 of the outer rotor is equal.

In some embodiments, when the ratio of the diameter of the outer magnetic cylinder wall 232 and the diameter of the inner magnetic cylinder wall 212 of the electric machine 10 approaches 1, the number of magnets on the outer rotor and inner rotor would be equal. However, if the ratio between the diameters were to approach 3 or higher than 3, then in certain embodiments the number of magnets on the outer rotor may be at least double the number of magnets on the inner rotor. For instance, in an electric machine 10 having inner and outer rotors having 4 Halbach Array poles as described below, the inner rotor may comprise 8 magnets and the outer rotor may comprise 16 magnets.

FIG. 1B2 is an isometric view of one embodiment of a magnetic tunnel segment 150 which defines an interior space or "magnetic tunnel"158. For instance, the magnetic tunnel segment 150 illustrated in FIG. 1B2 may be a portion of the magnetic toroidal cylinder 100 illustrated in FIG. 1B1 and FIG. 1B3. Arrow 122 illustrates a circumferential direction with respect to the longitudinal axis 101 and arrow 124 illustrates a radial direction with respect to the longitudinal axis 101. Arrow 122 also indicates a relative circular path of motion of the electric machine 10.

For the particular magnetic tunnel segment 150, the north magnetic pole(s) of the magnet(s) forming the outer radial magnet wall 232 are orientated in a radial direction, such that they face inward towards the interior space or tunnel 158. Similarly, the north magnetic pole(s) of the magnet(s) forming the inner radial magnet wall 212 are orientated in a radial direction such that they also face inward towards the interior space or tunnel 158. Thus, both the outer radial magnet wall 232 and the inner radial magnet wall 212 have their magnetic poles generally orientated in the radial direction with respect to the longitudinal axis 101 as indicated by the arrow 124 of FIG. 1B2. In contrast, the magnetic poles of the magnets forming the first axial magnet wall 222 and the second axial magnet wall 242 have their magnetic poles orientated generally parallel to the longitudinal axis 101.

Thus, in the illustrative embodiments of FIGS. 1B2 and 1B3, the individual magnets in the magnet walls 212, 222, 232, and 242 all have their "like magnetic poles" orientated towards the interior space 158 or away from an interior space 158 enclosed by the magnet walls 212, 222, 232, and 242 of the magnetic toroidal tunnel segment 150. The term "like magnetic poles" used in this disclosure refers to a group of magnetic poles of either all north poles or all south poles. For instance, the magnetic pole orientation or configuration illustrated in FIG. 1B2 may be called a "NNNN" magnetic pole configuration because all of the magnets forming the magnet walls 212, 222, 232, and 242 have their north poles facing inward.

In some embodiments, one or more of the magnetic walls may define a transverse slot. For instance, in the illustrative embodiment of FIG. 1B2. In the outer radial magnet wall 232 and the first axial magnet wall 222 may define a slot 112 or the inner magnetic cylinder wall 212 and/or outer magnetic cylinder wall 232 may define a slot 110. In certain embodiments, the slots 110, 112 may be wide enough to be used to enable the passage of a support structure, electrical wires and/or conduits or cooling conduits, but narrow enough to keep the flux forces from exiting through the slots.

FIG. 1B3 illustrates the complete magnetic toroidal cylinder 100 formed from combining four magnetic tunnel segments 150a through 150d arranged circumferentially around a common center or longitudinal axis 101 and inter-dispersed within four magnetic tunnel segments 180a through 180d. The poles of magnets creating the magnetic tunnel segments 150a through 150d are orientated in a specific geometric arrangement to form a NNNN. The poles of magnets creating magnetic tunnel segments 180a through 180d are orientated in a specific geometric arrangement to form a SSSS magnetic configuration.

Coil Winding Assembly:

When the electric machine 10 is assembled, a coil winding assembly 500 is concentrically positioned between the outer radial magnetic wall 232 and the inner radial magnet wall 212, and also longitudinally positioned between the first axial magnet wall 222 and the second axial magnet wall 242 forming the magnetic toroidal cylinder 100.

FIG. 1C1 is a detailed isometric view of a coil module 30. The coil winding assembly 500 may be formed by a plurality of coil modules 30 and stator poles positioned about a central core or yoke 42 (see FIGS. 1C1 through 1D3.

In some embodiments, the central core 40 may be made from tape wound magnetic steel laminations using high-speed tape winding techniques. The tape may have an insulated coating which then separates each magnetic steel lamination so that the magnetic flux cannot migrate from one lamination to the next. In other embodiments, the tape may be coated with an insulating layer of an electrically insulating polyimide sheet, an aromatic nylon sheet, a synthetic fiber sheet, or other non-surface core plating electrically insulating sheet to further reduce the flux and current flow. This forces the magnetic flux to stay in within each magnetic steel lamination and to flow only in the plane of the magnetic steel tape.

FIG. 1C2 is a detailed exploded isometric view of the various components comprising the coil module 30 including a bobbin 36, a coil 526, a PCB module 32, and the first pole portion 34a.

In certain embodiments, cooling conduits may be located within the coil winding assembly 500 in close proximity to the one or more corners of the coils 526. In another embodiment, the coils 526 are bifurcated axially by a thermal pyrolysis graphite membrane that functions as a solid-state heat pipe, such that heat is removed from the coils 526.

In some embodiments, the bobbin 36 may be sized to be positioned onto a yoke 42, discussed below. In certain embodiments, the bobbin 36 may be made from a Polyether ether ketone (PEEK), which is a colorless organic thermoplastic polymer material or a glass-reinforced thermoplastic. The coil 526 surrounds and is wound around the bobbin 36. The coil 526 may be made from a conductive material wire, such as copper or a similar alloy. In other embodiments, concentrated windings may be used. In certain embodiments, the individual coils 526 may be essentially cylindrical, square, or rectangular in cross-sectional shape.

The windings of each coil 526 are configured such that they are generally perpendicular to the direction of the relative movement of the magnets or rotor. In other words, the coil windings 526 are positioned such that their longitudinal sides are parallel with the longitudinal axis 101 and their ends or axial sides are radially perpendicular to the longitudinal axis 101. Thus, the coil windings 526 are also transverse with respect to the magnetic flux produced by the individual magnets of the rotor at their interior face. Consequently, essentially the entire coil winding 526 or windings may be used to generate motion in motor mode or voltage in generator mode.

The PCB module 32 is positioned radially adjacent to the inside face of the coil 526 and is electrically coupled to the coil 526. In some embodiments, the PCB module 32 may be configured to route the leads of the coil 526 to the center or exterior of the stator. In certain embodiments, the PCB module 32 may include one or more sensors, including, current sensors, rotor(s) position sensors, thermal sensors and Hall Effect sensors (not shown) that relay operational parameters of the coil winding assembly during operation or prior to operation by an embedded wireless antenna. In some embodiments, one or more of the thermal sensors may be a thermocouple. In yet other embodiments, there may be antennas and transceivers for wireless power transfer and/or communication transfer. In certain embodiments, there may be PCB connectors 37 that allow the coils 526 to plug directly into a brushless motor controller (not shown) or a PCB power module (not shown) 1202.

FIG. 1C3 is an isometric view of a coil module 30 sandwiched between two pole portions 34a and 34b. In some embodiments, the coil module 30 may be sandwiched between the two pole portions 34a and 34b for phasing purposes. In yet other embodiments, a "coil" for phasing purposes may actually be two physical coils 526 (and its associated bobbin 36 and PCB module 32) separated by the pole portions 34a or 34b. Positioning the coils 526 within the pole portions 34a and 34b reduced the air gap between the coils 526. By reducing the air gap, the coil winding assembly 500 can contribute more flux linkage to the overall torque produced by the motor. In certain embodiments, the first pole portion 34a and second pole portion 34b may operate together as a single pole for phasing purposes. In another embodiment, the pole portions 34a, 34b may be shaped on their leading edges so as to draw warm fluid from within an interior volume of the coil winding assembly 500.

When the coil winding assembly 500 is energized, the current running through the coil windings 526 positioned within the magnetic tunnel segments 150a through 150d runs in an opposite direction than the current running through the coil windings positioned in the magnetic tunnel segments 180a through 180d so that the direction of the generated magnetic force or torque is the same throughout the entire magnetic toroidal cylinder 100.

In certain embodiments, the pole portion 34 is a flux concentrator and is formed such that one side of the coil 526 partially fits within an indent formed within the side of the respective pole portion. In certain embodiments, the pole portion 34 may be a solid material structure, which is sintered cast or 3D printed, solid block material, back iron material, and/or heatsink material. In some embodiments, the pole portion 34 may be made from aluminum and may be used as a heat sink to draw heat to either the back-iron circuit described below or another cooling mechanism or heat sink.

In yet other embodiments, the pole portion 34 may be formed of a "soft magnetic" material. In certain embodiments, an isolation spacer or heat sink (not shown) may be positioned on the central core 42 adjacent to the pole portion 34a or 34b. In some embodiments, the spacer may be made from a lightweight non-magnetic filler material, such as aluminum, TPG, carbon fiber, or plastic. In other embodiments, potting material may be used as a spacer. As described above, the magnets of the magnetic toroidal cylinder 100 focus the flux inwardly, but the poles and spacers can further direct the flux flow path as desired.

The Central Core or Yoke

FIG. 1D1 is an isometric view of a central core or yoke 42 for the coil winding assembly 500. The central core 42 distributes magnetic flux to each of the stator poles 34 in the plurality of stator poles. The central core 42 may be made out of back iron material so that it will act as a magnetic flux force concentrator and distributes magnetic flux to each of the stator pole portions 34a and 34b. In some embodiments, the central core 42 may define one or more fluid communication passageways to allow for air or liquid cooling. In certain embodiments, the central core 42 may be made of at least two central core segments 42a and 42b. In one embodiment, a cross-sectional shape of the central core 42 may be configured to promote even flux distribution to the stator poles. For instance, the cross-sectional shape of the central core 42 may be square, rectangular, trapezoidal, circular, or any other shape that promotes even flux distribution to the desired areas of the stator poles.

The coil modules 30 are modular and the size of the bobbin 36 and pole portions 34a and 34b are designed to allow the PCB modules and pole portions to slide over the central core segments 42a and 42b. FIG. 1D2 is an isometric view of the central core segment 42a having two coil modules 30 positioned about the coil segment 42a. FIG. 1D3 is an isometric view of the central core segment 42a illustrating coil modules completely positioned over the central core segment 42a. Any number of coil modules 30 may be coupled depending on the particular application. In some embodiments, the coils 526 may essentially form one continuous coil 526, similar to a Gramme Ring.

FIG. 1E1 is an isometric view of a coil winding assembly 500 formed by joining the core portion illustrated in FIG.

1D3 with another core portion also having a full complement of coil modules 30 and a spider stator 604.

In some embodiments, the spider stator 604 assists with placement and alignment of the coil modules 30 and is designed to fit within a central interior space of the coil winding assembly 500 as illustrated. In certain embodiments, the spider stator 604 has a plurality of radial arms 610. At the distal end of each radial arms 610 is a dovetailed engagement notch 605. The engagement notch 605 is sized to be slid into the respective receiving slot 47 formed in the pole portions 34a and 34b (see FIG. 1C1) of the coil modules 30. The spider stator 604 helps align the individual coil modules 30 and indirectly joins the two central core segments 42a and 42b together.

Once the spider 604 is in position, a PCB power module 640 can then be added to the coil winding assembly 500 as illustrated in FIG. 1E2. The PCB power module 640 is designed to fit within a central interior space of the coil winding assembly 500. In certain embodiments, the PCB connectors 37, as illustrated in FIGS. 1C1 through 1C4, can be electrically coupled to the PCB power module 640.

In order maintain the generated torque and/or power the individual coils 526 in the coil winding assembly 500 may be selectively energized or activated by way of a high-power switching system or brushless motor controller 1204 which selectively and operatively provides electrical current to the individual coils 526 in a conventional manner. In order to maintain rotation adjacent coils 526 may be powered up in turn. For instance, the brushless motor controller 1204 may cause current to flow within the individual coil 526 when the individual coil 526 is within a magnetic tunnel segment with a NNNN magnetic pole configuration. On the other hand, when the same individual coil moves into an adjacent magnetic tunnel segment with a SSSS magnetic pole configuration, the brushless motor controller 1204 causes the current within the individual coil 526 to flow in the opposite direction so that the generated magnetic force is always in same direction.

The individual coils 526 may use toroidal winding without end windings and in some embodiments be connected to each other in series. In other embodiments, a three-phase winding may be used where adjacent coils 526 are connected together to form a branch of each phase. For instance, two adjacent coils 526 may be phase A coils, the next two adjacent coils 526 may be phase B coils, and the next two adjacent coils 526 may be phase C coils. This three-phase configuration would then repeat for all individual coils 526 within the coil winding assembly 500. When the coils 526 are energized, the three-phase winding can produce a rotating magnetic field in the air gap around the coil winding assembly 500. The rotating magnetic field interacts with the magnetic field generated by the toroidal magnetic tunnel producing torque and relative movement between the coil winding assembly 500 and the toroidal magnetic tunnel. That is, the brushless motor controller 1204 applies current to the phases in a sequence that continuously imparts torque to turn the magnetic toroidal cylinder 100 in a desired direction, relative to the coil winding assembly 500, in motor mode.

In certain embodiments, the brushless motor controller 1204 may be electrically coupled to the PCB interconnect board 602 to form a power module assembly 606. In one embodiment, the power module assembly controller 606 may be designed to fit within an interior central cavity of the coil winding assembly 500 as illustrated in FIG. 1E2. In another embodiment, the power module assembly controller 606 may be potted.

In other embodiments, the electric machine 10 may have vents for air flow circulation. In this embodiment the side wall of the first axial rotor core 225 or second axial rotor core 245 includes a plurality of outer notches or vents defined around the outer circumference wherein the notches are sized to induce an air flow. There may also be a plurality of inner notches or vents defined around the inner circumference of the side wall of the first axial rotor core 225 or the second axial rotor core 245.

As opposed to "pancake style" or electric machine 10, in certain embodiments, the longitudinal length or "width" of the outer circumferential wall of the outer rotor core 235 and inner circumferential wall of the inner rotor core 215 are greater than the radial depth or lateral length of the side walls of the first axial rotor core 225 and 245.

This exemplary geometric proportion results in greater torque generation along the interface of the outer circumferential wall of the outer rotor core 235 and coil winding assembly 500. In certain alternate embodiments, the thickness of the magnets comprising the outer magnetic wall 232, and in one embodiment the inner magnetic wall 212, may also be increased to increase the generation of torque. In any event, the contribution to torque from the outer magnetic wall 232, and the inner magnetic wall 212 may, be greater than the contribution from the first axial magnetic wall 222 and the second axial magnetic wall 242 due to the geometry of the cross-section of the magnetic tunnel segments 220, 421 and the varying effect force/radius of the components.

Although the central core 42, coil winding assembly 500, and magnetic tunnel segments 150, 180 are illustrated in cross-section as rectangular, any cross-sectional shape may be used depending on the design and performance requirements for a particular electric machine 10.

Advantages of Certain Embodiments

One of the advantages of this type of configuration over conventional electric motors is that the end turns of the coils 526 are part of the "active section" or force generation section of the electric machine 10. In conventional electric motors, only the axial length of the coils produces power, the end turns of the coils do not produce power and merely add weight and copper losses. However, as explained above, the entirely of the coil 526 is effectively utilized to produce torque because of the side axial magnetic walls 222, 242 or axial magnets. Therefore, for a given amount of copper more torque can be produced compared to a conventional electric motor.

In summation, surrounding the coils 526 with magnets creates more flux density and most of the magnetic forces generated are in the direction of motion so there is little, if any, wasted flux compared to a conventional electric motor. Further, because the forces are now all in the direction of motion more torque is generated and the configuration further minimizes vibration and noise compared to a conventional electric motor where the forces, depending on the polarity of the current in the coil may try and pull the coil downwards or push the coil upwards and therefore not in the direction of motion. Further, continuous torque and continuous power are greatly increased compared to a conventional electric motor as is the motor's torque density and power density by volume and weight. Even further, although the coil winding assembly 500 may be compact, the coils 526 are easily cooled because they are surrounded by an effective heat sink and since there is little to no overlap of the coil windings 526, there is little if any unwanted field induction which also contributes to a more efficient electric motor design.

Torque Tunnel Halbach Array Electric Machine Embodiment

Invented by Klaus Halbach in the 1980s at the Lawrence Berkeley National Laboratory, the Halbach Array is a special arrangement of permanent magnets having a spatially rotating pattern of magnetization that augments the magnetic field strength on one side of the Halbach Array while decreasing the magnetic field strength on the other side of the Halbach Array because the magnetic flux is contained within the magnets of the circuit.

In certain embodiments, a Halbach Array may not require a ferrous back-iron material behind the permanent magnet of the Halbach Array and a lightweight non-magnetic finer material, such as aluminum, carbon fiber, plastic, and the like may be used instead of a ferrous back iron material to reduce weight, although the thickness of the aluminum may have to be increased to provide the necessary structural strength.

In some embodiments, the linear machine 10 may include an array of permanent magnets having different magnetic orientations, that is a Halbach Array, configured to generate a spatially rotating pattern of magnetization. In such an arrangement, the magnetic field strength may be almost doubled on an augmented side and near zero on a diminished side when compared to a conventional array of permanent magnets having the same orientation or an alternating N-S-N-S-N geometry. That is, the Halbach Array is a more efficient use of magnet alloy that may justify the increased difficulty in manufacturing when an air "gap" exists in the application. The main disadvantages of the Halbach Array geometry are that it can be difficult to combat the forces during assembly and ensuring the assembly will hold together during its use. Another disadvantage is that the magnets of the Halbach Array are arranged in a quasi-direct repelling condition, which means magnets in the same array may act to demagnetize their adjacent magnets at elevated operating temperatures. In certain embodiments, a high coercive force magnet alloy may be used to address this issue. For instance, the high coercive force magnet alloy may be Neodymium Iron Boron (NdFeB) or Samarium Cobalt (SmCo).

FIG. 1F1 illustrates the stand-alone flux field of an array of eight magnets having the same orientation and their stand-alone flux field. In certain embodiments, the Halbach Array of permanent magnets may include four magnets having different magnetic orientations. FIG. 1F2 illustrates the corresponding stand-alone flux field of an array of eight permanent magnets having a spatially rotating pattern of magnetization. Specifically, FIG. 1F2 illustrates a Halbach Array of 4 magnets, forming 2 poles or 1 pole pair, which is repeated twice for a total of 8 magnets, forming 4 poles or two pole pairs. That is, FIG. 1F2 shows a Halbach Array using a somewhat coarse 90-degree orientation change between adjacent magnet elements. A Halbach Array having a smaller angle, such as 45 degrees, will result in a better approximation of a circumferential field orientation at the augmented side of the Halbach Array, which results in more homogenous and thereby stronger flux field, thereby improving the efficiency of the electric motor 10. In one embodiment, the Halbach Array of permanent magnets may include eight magnets having 45 degrees orientation change between adjacent magnets. FIG. 1F3 illustrates the corresponding stand-alone flux field of an array of eight permanent magnets having a 45 degrees orientation change between adjacent magnets as shown in FIG. 1F4. In yet another embodiment, the Halbach Array of permanent magnets may include twenty-four magnets having 15 degrees orientation change between adjacent magnets.

FIG. 2A is an isometric view illustrating one embodiment of a Torque Tunnel Halbach Array Electric Motor (THEM) 200. An alternate use of the same mechanical configuration is as a Torque Tunnel Halbach Array Electric Generator (THEG) where the sequentially switching of a load across the different windings is synchronized to the rotation. In the following embodiments the abbreviation THEM 200 may therefore be extended to mean Torque Tunnel Halbach Array Electric Machine. In the illustrative embodiment of FIG. 2A the THEM 200 may have a plurality of toroidal wound phase coils arranged circumferentially around a common stator core having uniform angular spacing. The plurality of phase coils being encompassed by an inner radial rotor, an outer radial rotor, and two axial rotors having purposely arranged Halbach Array type permanent magnets.

Advantages of Certain Embodiments

Higher efficiency is always a requirement for electric machines and Flux Density Distribution (FDD) within an electric machine has a significant effect on the electric machine's torque, efficiency, torque ripple, and pulsation performance. Electric machines equipped with Halbach Arrays present some significant advantages over conventional permanent magnet electric machines. For instance, an increased flux density in the air gap, which results in higher levels of torque and torque density. A reduction in the level of magnetic flux density harmonics in the air gap, which results lower levels of torque ripple. An absence of magnetic flux density at the back of the Halbach Array, which results in higher levels of torque density at the front of the Halbach Array. An absence of back-iron material, which results in higher levels of acceleration, once the weight associated with the back-iron material has been removed.

This patent application further discusses novel methods and systems of increasing the flux density in an electric machine through the novel arrangement of multiple rotors having a plurality of flux shaping Halbach Arrays configured to increase the Flux Density Distribution (FDD) in a closed magnetic torque tunnel. Surrounding the coils 526 of the coil winding assembly 500 with Halbach Arrays creates more flux density than a conventional electric machine and most of the magnetic forces generated are in the direction of motion so there is little, if any wasted flux compared to a conventional electric motor. Further, because the forces are now all in the direction of motion more torque is generated and the configuration further minimizes vibration and noise compared to a conventional electric motor where the forces, depending on the polarity of the current in the coil may try and pull the coil downwards or push the coil upwards and therefore not in the direction of motion. Even further, continuous torque and continuous power are greatly increased compared to a conventional electric motor as is the motor's torque density and power density by volume and weight. Yet further, although the coil winding assembly 500 may be compact, the coils 526 are easily cooled because they are surrounded by an effective heat sink and since there is little to no overlap of the coil 526 of the coil winding assembly 500 there is little if any unwanted field induction, which also contributes to a more efficient electric motor design.

Another advantage of an electric machine 10 having multiple rotors is that the end turns of the coils 526 are part of the "active section" or force generation section of the electric machine 10. In contrast, in a conventional electric machine only the axial length of the coils produces power, the end turns of the coils do not produce power and merely add weight and copper losses. In some of the followings embodiments, the entirety of the coil 526 is effectively utilized to produce torque, because the coils 526 of the coil winding assembly 500 are encapsulated in their entirely by the axial magnets of the side axial walls (rotors) and the radial magnets of the inner and outer radial walls (rotors). Therefore, for a given amount of coil copper more torque can be produced by an electric machine 10 having a multiple rotor configuration compared to a conventional electric machine. The result is a very light, very compact electric machine 10 assembly with very smooth commutation and unlatched levels of torque and efficiency.

Figure 2B:
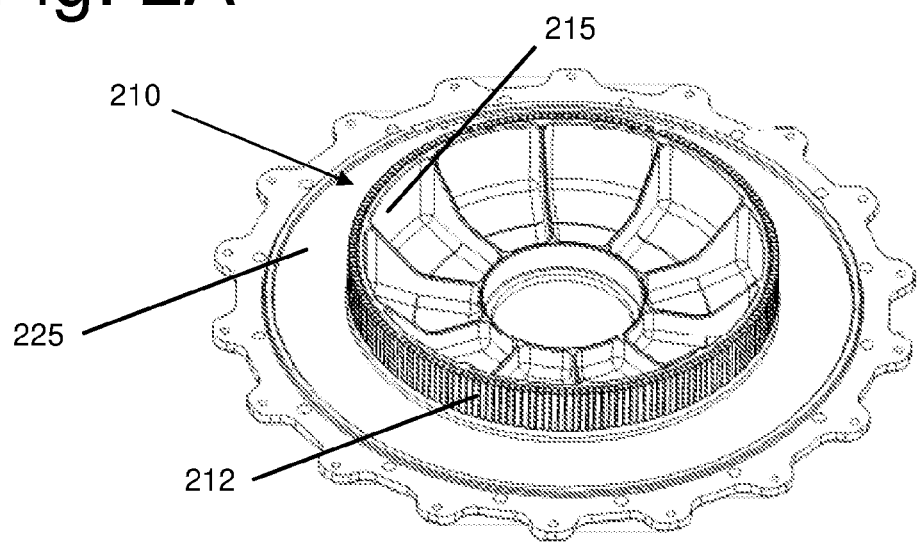
FIG. 2B is an isometric view of an inner rotor assembly of the Torque Tunnel Halbach Array Electric Machine.

FIG. 2B is an isometric view illustrating an inner rotor assembly 210 of the THEM 200. In some embodiments, the inner rotor assembly 210 may comprise a plurality of inner rotor axial permanent magnets 212 positioned about and coupled to an inner rotor core 215. In certain embodiments, the inner rotor permanent magnets 212 may be ideal or substantially ideal Halbach Arrays. In practice it may be impractical to use ideal Halbach Arrays and the Halbach Arrays may be constructed with segments of permanent magnets 212 configured to form quasi-Halbach Arrays. In some embodiments, the segments of permanent magnets 212 may be substantially the same size, such that they are arranged circumferentially around the inner rotor core 215 having uniform angularly spacing. In certain embodiments, the angular width of the segments of permanent magnets nearest the poles of the Halbach Arrays may be greater than the angular width of the segments of permanent magnets 212 furthest from the poles of the Halbach Arrays. In either case, the plurality of flux shaping Halbach Arrays are configured to increase the 3D magnetic flux field in the magnetic toroidal cylinder 100, such that the FDD is increased. In theory a Halbach Array, at least an ideal Halbach Array, may not require ferromagnetic back iron material behind the permanent magnets of the Halbach Array. In practice, a back-iron circuit, albeit a smaller back iron circuit, may still be advantageous especially with quasi-Halbach Arrays to improve the overall performance of the THEM 200. Therefore, in certain embodiments, the inner rotor core 215 may be constructed of, at least in part, a ferrous back iron material such that the FDD is increased.

The flux path of each pole pair segment of the THEM 200 can be considered to travel through a magnet 212 having a N pole configuration of the inner rotor assembly 210 across an air gap into the stator and then back across the air gap into an adjacent magnet 212 having a S pole configuration of the inner rotor assembly 210 completing the circuit via the back iron of the inner rotor assembly 210. As the number of poles increases, the length of the flux path is reduced. More importantly, as the number of poles increases the amount of flux traveling between adjacent poles is reduced, which means that less back iron material is required, and therefore the weight of the core of the inner rotor assembly 210 can be reduced or the weight of the central core or yoke 42 can be reduced.

In certain embodiments, the number of pole pairs of the THEM 200 may be increased for the purposes of reducing the weight of the back iron components and therefore the weight of the electric machine 10, which further increases the torque density of the THEM 200.

Ideally the power losses in the THEM 200 should be confined to the copper losses in the coil winding assembly 500 of the stator. However, while the central core or yoke 42 of the coil winding assembly 500 and inner rotor core 215 of the inner rotor assembly 210 of theft respective back-iron circuits are not designed to have any current flowing through them they are however conducting loops that experience a changing magnetic field. Therefore, the central core 42 and inner rotor core 215 of the inner rotor assembly 210 will have small currents induced in them that are proportional to the area of the loop formed by theft respective back iron circuits. These induced currents are called eddy currents and the losses associated with the eddy currents, and hysteresis, must be added to the copper losses in the coil winding assembly 500 when determining the efficiency of the THEM 200.

Conventional electric motors have conventionally been made with either or both the stator core and the rotor core made of laminated ferromagnetic sheets that have an insulating coating on each side, which are stacked to form a core assembly. The thickness of the laminations is directly related to the level of heat losses produced by the electric motor when operating, which is commonly referred to as eddy current losses. The thinner the laminations, the less the eddy current losses.

In certain embodiments, the thickness of the laminated strips of the THEM 200 may be less than about 2 mm. In one embodiment, the air gap between adjacent laminations is less than about one-half mm thick. In other embodiments, the inner rotor assembly 210 or central core 42 of the THEM 200 may comprise laminated strips of electrical steel separated by a small airgap. Electrical steel, also known as lamination steel, silicon electrical steel, silicon steel, relay steel, transformer steel, and the like, is an iron alloy tailored to produce specific magnetic properties: small hysteresis area resulting in low power loss per cycle, low core loss, and high permeability. In certain embodiments, the central core 42 may be made from a tape wound magnetic steel. In some embodiments, the material may be Hiperco 50 ®, Metglas®, Somlaloy®, or even magnetic tape back.

In certain embodiments, the electrical steel sheets may be coated with an electrical insulator to increase electrical resistance between the laminations, to further reduce eddy currents, provide resistance to corrosion or rust, and to act as a lubricant during the die cutting process. In one embodiment, the steel laminations may be coated with an oxide layer. In another embodiment, the steel laminations may be coated with an insulating polyimide sheet, an aromatic nylon sheet, a synthetic fiber sheet, or other non-surface core plating electrically insulating sheet to further reduce the flux and current flow.

In certain embodiments, the steel laminations may be made from a 2D flux path material, such as Cold-rolled Grain-Oriented (CRGO) electrical steel. CRGO electrical steel has a high-silicon level of about 3% (Si: 11Fe), which increases the resistivity of the electrical steel to several times that of pure iron.

These laminated stator or rotor structures create a predominately 2D flux path inside the cores for the magnetic flux to follow when the THEM 200 is in operation. Referring once more to the 4-rotor embodiment of FIG. 2A the flux may not act in substantially a single direction. Therefore, 2D flux path material, such CRGO electrical steel laminations used in a conventional electric motor may not be the best choice.

In certain embodiments, a 3D flux path material may be used for the rotor core(s) 215, 225, 235, and 245 and central core 42 of the THEM 200. The 3D flux path material may comprise a soft magnetic composite (SMC) material, for instance ferromagnetic particles that are individually surrounded by an insulative material or film, that, when bonded together into a solid block form a composite material that enables the magnetic flux to flow in any direction throughout the block with low eddy current losses.

In certain embodiments, the 3D flux material may be a ferromagnetic open cell metal foam material which is infused with a structural support matrix made of thermoset or a thermoplastic resin material. The ferromagnetic open cell metal foam material may have porosity of between about 75% and about 95% by volume and be used as an alternative to the laminated or SMCs cores discussed herein. Using a ferromagnetic open cell structure would result in an electric machine 10 that is substantially lighter in weight than other electric machines available on the market and enable a significantly higher torque density than existing electric motors whether they be of the 2D or 3D flux path motor architecture type.

Figure 2C:
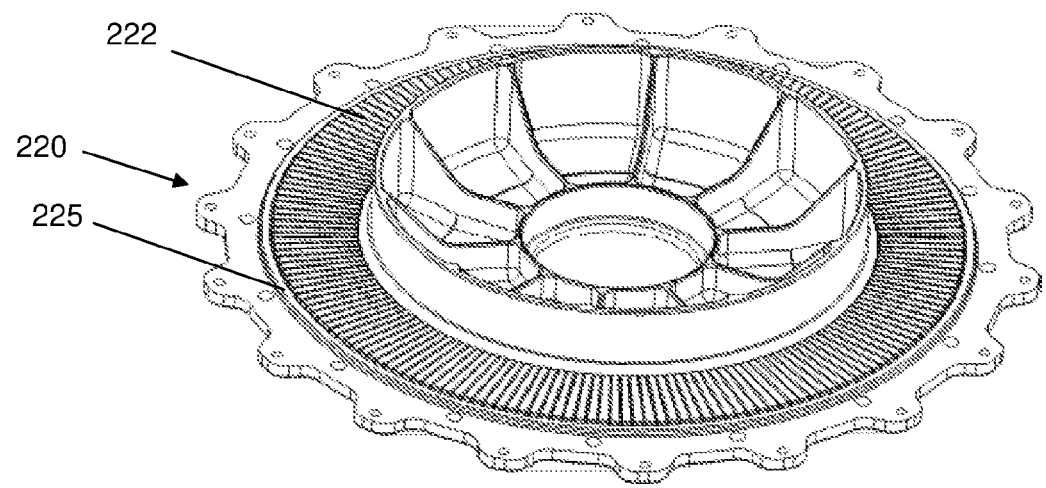
FIG. 2C is an isometric view illustrating a first axial rotor assembly of the Torque Tunnel Halbach Array Electric Machine.

FIG. 2C is an isometric view illustrating a first axial rotor assembly 220 of the THEM 200. In some embodiments, the first axial rotor assembly 220 may comprise a plurality of first axial permanent magnets 222 positioned about and coupled to a first axial inner rotor core 225. In certain embodiments, the first axial permanent magnets 222 may be ideal or substantially ideal Halbach Arrays. In other embodiments, the Halbach Arrays may be constructed with segments of permanent magnets 222 configured to form quasi-Halbach Arrays. In either case, the plurality of flux shaping Halbach Arrays are configured to increase the 3D magnetic flux field in the magnetic toroidal cylinder 100, such that the FDD is increased. In certain embodiments, the first axial rotor core 225 may be constructed of, at least in part, a ferromagnetic back iron material. In other embodiments, the first axial rotor core 225 may be constructed of a nonferromagnetic material.

Figure 2D:
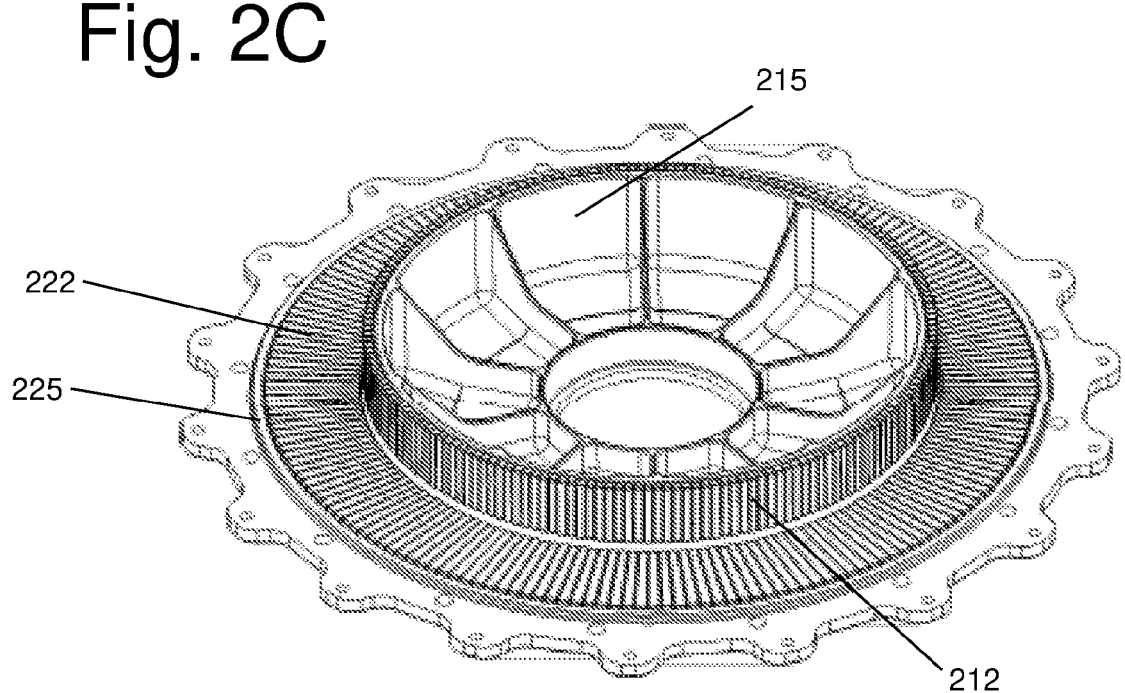
FIG. 2D is an isometric view illustrating the first axial rotor assembly of FIG. 2C coupled to the inner rotor assembly of FIG. 2B.

FIG. 2D is an isometric view illustrating the first axial rotor assembly 220 of FIG. 2C coupled to the inner rotor assembly 210 of FIG. 2B. In certain embodiments, the first axial rotor assembly 220 may be coupled at an inner edge to a first end of the inner rotor assembly 210. In one embodiment the inner core 215 and the first axial rotor core 225 may be integral parts of a common casting.

FIG. 2E is an isometric view illustrating an outer rotor assembly 230 of the THEM 200. In some embodiments, the outer rotor assembly 230 may comprise a plurality of outer rotor permanent magnets 232 positioned about and coupled to an outer rotor core 235. In certain embodiments, the outer rotor permanent magnets 232 may be ideal or substantially ideal Halbach Arrays. In other embodiments, the Halbach Arrays may be constructed with segments of permanent magnets 232 configured to form quasi-Halbach Arrays. In either case, the plurality of flux shaping Halbach Arrays are configured to increase the 3D magnetic flux field in the magnetic toroidal cylinder 100, such that the FDD is increased. In certain embodiments, the outer rotor core 235 may be constructed of, at least in part, a ferromagnetic back iron material. In other embodiments, the outer rotor core 235 may be constructed of a nonferromagnetic material.

FIG. 2F1 is an isometric view illustrating a THEM 200 having an outer rotor assembly 230 adjacent to an inner rotor assembly 210. That is, FIG. 2F illustrates the rotor assembly of a new class of Torque Tunnel Halbach Array Electric Machine, a Double-rotor Torque Tunnel Halbach Array Electric Machine (DTHEM) having a single Halbach Array coil winding assembly 500 (not shown). Specifically, FIG. 2F1 illustrates a radial DTHEM. The radial DTHEM of FIG. 2F1 may be ideal for applications where the total length is constrained, like a direct drive hub of an electric vehicle.

In some embodiments, a double rotor configuration, be it axial DTHEM (FIG. 2F1) or radial DTHEM (FIG. 2F2), may achieve a greater maximum phase flux linkage ($\lambda$max) for a given volume than a conventional electric machine having a single rotor. A double rotor configuration may therefore be a more efficient configuration in terms of torque and motor efficiency compared to a convention electric machine. Another advantage of having multiple rotors, be it two, three, or four, is that their higher inertia makes them better suited for pulsating loads, such as reciprocal compressors. The effect of having multiple rotors on flux linkage, magnetic saturation, flux density, and torque may be studied using finite element analysis.

FIG. 2G is an isometric view illustrating the first axial rotor assembly 220 and inner rotor assembly 210 of FIG. 2D coupled to the outer rotor assembly 230 of FIG. 2E. For instance, the first axial rotor assembly 220 may be attached at an inner edge to a first end of the inner rotor assembly 210 and may also be attached at an outer edge to a first end of the outer rotor assembly 230. That is, FIG. 2G illustrates the rotor assembly of a new class of THEM 200, a Triple Rotor Torque Tunnel Halbach Array Electric Machine (TTHEM) having a single Halbach Array coil winding assembly 500 (not shown). A TTHEM configuration offers advantages over a conventional electric machine in terms of torque and motor efficiency.

In certain embodiments, the rotor assembly of the TTHEM may comprise the inner rotor assembly 210 attached at a first end to an inner edge of the first axial rotor assembly 220 and also attached at a second end to an inner edge of the second axial rotor assembly 240. In another embodiment, the rotor assembly of the TTHEM may comprise the outer rotor assembly 230 attached at a first end to an outer edge of the first rotor assembly 220 and also attached at a second end to an outer edge or the second axial rotor assembly 240.

FIG. 2H1 is an isometric view illustrating a coil winding assembly within the rotor assembly of FIG. 2G. In some embodiments, the rotating sinusoidal Magnetic Force (MMF) of the THEM 200 may be produced by the coil winding assembly 500 described above for torque production. In certain embodiments, the rotating sinusoidal MMF of the THEM 200 may be produced by the Halbach Array coil winding assembly 500 illustrated in FIG. 2H2. For instance, the Halbach Array coil winding assembly 500 may have more poles than the coil winding assembly 500 described above.

In one embodiment, the magnetic walls 212, 222, 232, and 242 of the THEM 200 may further define a transverse slot 550 around the Halbach Array coil winding assembly 500 which access for the support frame or spider stator inner 708a for the Halbach Array coil winding assembly 500 to pass through the magnetic walls of the rotor assembly. In the illustrative embodiment of FIG. 2H3 the transverse slot 550 is defined by an inner edge of the second axial magnet wall 242 of the second axial rotor assembly 240 and the first end of the inner radial magnetic wall 212 of the inner rotor assembly 210.

FIG. 2H4 is an isometric view illustrating the Halbach Array coil winding assembly 500 and the support frame or spider stator inner 708a. In some embodiments, the spider stator inner 708a is further designed to assist with the placement and alignment of the stator poles 34 and the coils 526 of the Halbach Array coil winding assembly 500 on the central core segments 42a and 42b. As illustrated the spider stator inner 708a may also be designed to fit within a central interior space of the Halbach Array coil wining assembly 500. As illustrated, the spider stator inner 708a has a plurality of radial arms 610 configured to couple to the stator poles 34. In certain embodiments the distill end of the radial arms 610 may be welded or spot welded to a stator pole 34. In one embodiment, the distal end of the radial arms 610 may have a fastener, pin, or engagement notch 605, which is sized to be slidingly engaged into a receiving dovetailed engagement notch or slot 605 of a stator pole 34. While the spider stator inner 708a supports and aligns the stator poles 34 of the Halbach Array coil winding assembly 500 it also indirectly joins the two central core segments 42a and 42b together.

Figure 2J:
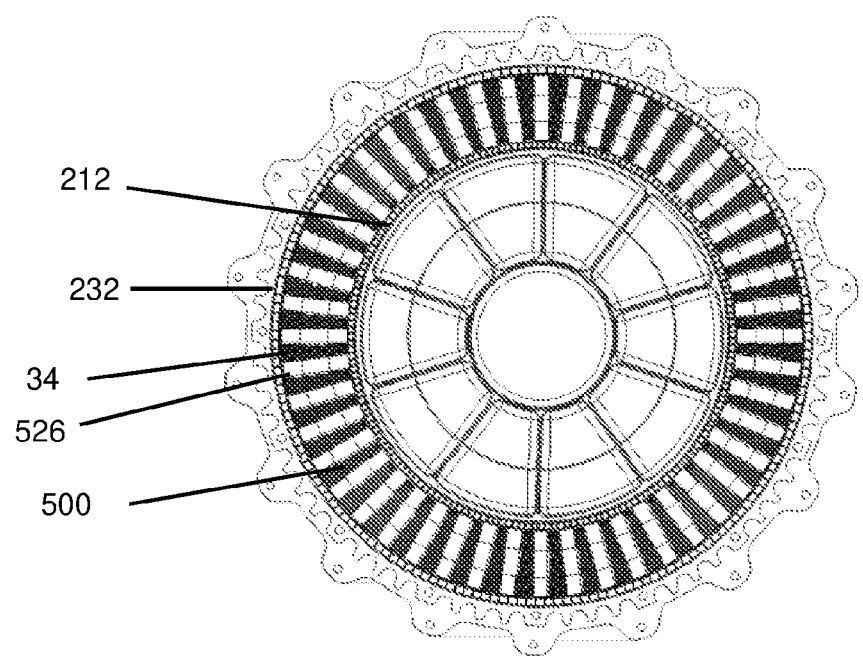
FIG. 2J is a section top view illustrating the Halbach Array coil winding assembly within the assembly of FIG. 2H1.

FIG. 2J is a section top view of the THEM 200 illustrating the Halbach Array coil winding assembly 500 within the rotor assembly of FIG. 2G. That is, FIG. 2J illustrates the relationship between the plurality of permanent magnets 212, 232 having different magnetic orientations forming the plurality of Halbach Arrays that are coupled to and positioned about the inner rotor core 215 of the inner rotor assembly 210 and the outer rotor core 235 of the outer rotor assembly 230, and the corresponding coils 526 and stator poles 34 of the 3-phase coil winding Halbach Array coil assembly 500.

In certain embodiments each of the Halbach Arrays of the THEM 200 may be formed of 4 permanent magnets having different magnetic orientations configured to form a Halbach Array having 2 poles or a single pole pair. In one embodiment each of the Halbach Arrays may be formed of 8 permanent magnets having different magnetic orientations configured to form a Halbach Array having 2 poles or a single pole pair. The configuration of permanent magnets of each Halbach Array may be repeated about the inner rotor core 215 of the inner rotor assembly 210 and outer rotor core 235 of the outer rotor core assembly 230 a number of times. For instance, the array of permanent magnets forming each Halbach Array may be repeated 23 times and therefore consist of either 184 (8 magnet Halbach Array) or 92 (4 magnet Halbach Array) permanent magnets configured to form 46 poles or 23 pole pairs. The associated 3-phase coil Halbach Array coil winding assembly 500 may include a sequential sequence of phase-A coils 526, phase-B coils 526, and phase-C coils 526 and the arrangement may be repeated for the length of the stator of the THEM 200. For instance, the Halbach array coil winding assembly 500 may have 48 coils formed of a sequential sequence of 8 coils of phase-A, 8 coils of phase-B, and 8 coils of phase-C in series followed by another sequential sequence of 8 coils of phase-A, 8 coils of phase-B, and 8 coils of phase-C in series. That is, the coil winding pattern may look like AaAaAaAabBbBbBbBCcCcCcCc aAaAaAaAaABbBbBbBbcCcCcCcC, where a lower-case letter represents a clockwise turn(s) and an upper case letter represents a counterclockwise turn(s), or vice versa, of each coil 526 of the A, B, and C phases.

Figure 2K:
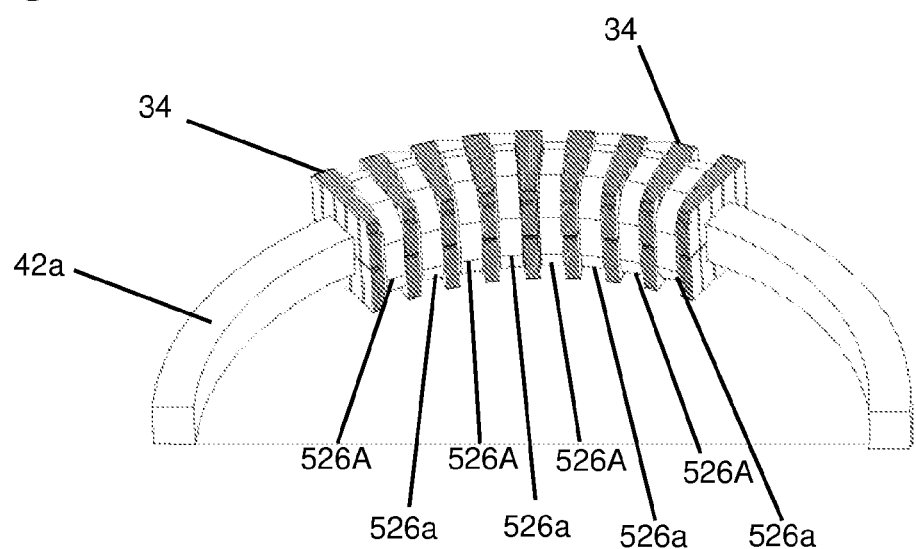
FIG. 2K is an isometric view illustrating a portion of the Halbach Array coil winding assembly.

FIG. 2K is an isometric view illustrating a portion of the Halbach Array coil winding assembly 500 having an AaAaAaAa coil sequence and associated stator poles 34 with the coils of the B and C phases, and second aAaAaAaA coil sequence of phase-A coils 526, and their associated stator poles 34 omitted for clarity.

In certain embodiments each coil 526 may comprise a single turn of conducting wire. For instance, a single turn of 11.5 American Wire Gauge (AWG) copper wire, which in some instances may have a square shape cross section for a higher packing factor. In one embodiment each coil 526 may comprise a plurality of turns of conductive wire. For instance, each coil 526 may comprise, 7 turns of 24 AWG copper wire, which in some instances may have a square shape cross section for a higher packing factor.

Figure 2L:
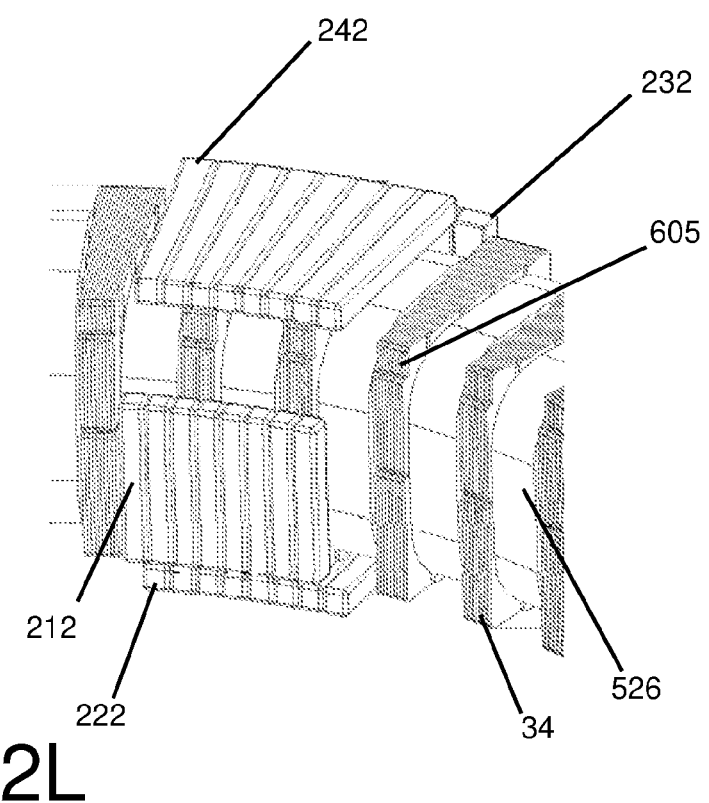
FIG. 2L is an isometric view illustrating a portion of the Halbach Array coil winding assembly comprising a single Halbach Array having eight magnets

FIG. 2L is an isometric view illustrating a portion of the Halbach Array coil winding assembly 500 comprising a single Halbach Array having eight magnets in each of the magnetic walls, 212, 222, 232, and 242 of rotor assemblies 210, 220, 230, and 240, respectively, and the localized coils 526 and stator poles 34. The other Halbach Arrays of each of the magnetic walls 212, 222, 232, and 242 have been omitted for clarity.

Referring once more to the embodiment of FIG. 2A. FIG. 2A is an isometric view of a THEM 200 according to the principles of the present invention having four rotors surrounding a coil winding assembly 500 having a plurality of stator poles or flux concentrators 34. That is, FIG. 2A illustrates a new class of THEM 200, a Quadruple rotor Torque Tunnel Halbach Array Electric Machine (QTHEM) where certain embodiments utilize one or more Halbach Arrays in all or a portion of the four rotors having a single Halbach Array coil winding assembly 500. In one embodiment, the ratio of Halbach Arrays from one rotor assembly to another may be different. That is the number of pole pairs formed by the plurality of Halbach Arrays in the rotor assemblies may be different.

The result is a novel ironless electric permanent magnet electric machine design using the Halbach Array and a magnetic torque tunnel with high power density, high torque, high specific power, and low power losses, even when operating at high revolutions per minute that are especially suitable for weight and volume sensitive applications, such as mobile electric vehicles.

In some embodiments, the entire Halbach Array coil winding assembly 500 may be potted with a potting compound, which may be an epoxy material. The four rotors of the QTHEM encompass the inner stator assembly or potted Halbach Array coil winding assembly 500 forming a toroidal permanent magnetic rotor ring around substantially all of the stator assembly. In certain embodiments, the one or more of the four rotors that encompass the inner stator assembly may comprise an electromagnet. For instance, one or more of the Halbach Array of magnets may be replaced by one or more electromagnetic coils that are configured to mimic all or part of a Halbach Array. In one embodiment, one or more of the electromagnetic rotors may function as a generator while the other Halbach Array rotors function as a motor. A full-wave three-phase rectification circuit may be employed with each generator to convert time-varying (AC) winding voltages to a constant (DC) voltage for the electrical system.

In some embodiments, the rotor assemblies may be connected together by a continuously variable transmission device that enables one or more of the rotor assemblies to operate at a different speed with respect to the other rotor assemblies. In some instances, the rotor assemblies may be connected together by a gear system that enables one or more of the rotors to operate at a different speed with respect to the other rotor assemblies. In certain embodiments, one or more of the rotors may be rotated by mechanical means with respect to the other rotor to create the effect of field weakening in the electric motor.

In yet another embodiment, the rotors of the electric machine 10 are arranged in such an orientation so as to function as a magnetic bearing assembly and thereby alleviate the need for one or more of the mechanical bearings. The magnetic bearing assembly may work on the principle of electromagnetic suspension based on, at least in part, the induction of eddy currents in a conductor loop moving through the magnetic field of the rotors that results in a magnetic field that repels the magnetic field of the rotors.

In order maintain the generated torque and/or power the individual coils 526 in the Halbach Array coil winding assembly 500 may be selectively energized or activated by way of a high-power electronic switching system or brushless motor controller 1204. In order to maintain rotation adjacent coils 526 may be powered up in turn. For instance, the brushless motor controller 1204 may cause current to flow within the individual coil 526 when the individual coil 526 is within a magnetic tunnel segment with a NNNN magnetic pole configuration. On the other hand when the same individual coil moves into an adjacent magnetic tunnel segment with a SSSS magnetic pole configuration, the brushless motor controller 1204 causes the current within the individual coil 526 to flow in the opposite direction so that the generated magnetic force is always in same direction.

The individual coils 526 may use toroidal winding without end windings and in some embodiments be connected to each other in series to form a single-phase stator assembly. In other embodiments, the electrical coils 526 may be connected in an array of separately connected series coils 526 to form a polyphase stator assembly. In certain embodiments, a three-phase winding may be used where adjacent coils 526 are connected together to form a branch of each phase. The coils 526 may be electrically separated from each other and controlled independently. For instance, two adjacent coils 526 may be phase A coils, the next two adjacent coils 526 may be phase B coils, and the next two adjacent coils 526 may be phase C coils. This three-phase configuration would then repeat for all individual coils 526 within the Halbach array coil winding assembly 500. When the coils 526 are energized, the three-phase winding can produce a rotating magnetic field in the air gap around the Halbach Array coil winding assembly 500. The rotating magnetic field interacts with the magnetic field generated by the toroidal magnetic tunnel producing torque and relative movement between the Halbach Array coil winding assembly 500 and the toroidal magnetic tunnel. That is, the brushless motor controller 1204 applies current to the phases in a sequence that continuously imparts torque to turn the magnetic toroidal cylinder 100 in a desired direction, relative to the Halbach Array coil winding assembly 500, in motor mode.

In certain embodiments, a single phase stator assembly may be connected axially with additional single phase stator assemblies that are rotated radially with respect to each other and affixed to a common structure that enables the individual single phase stator assemblies to work together as a polyphase electric machine. In another embodiment, the ring-shaped single-phase assemblies may be placed concentrically to one another to form a polyphase electric machine. In yet another embodiment, the electric machine 10 may include a plurality of concentrically nested machines configured to form either a larger single phase or a larger polyphase electric machine 10. For instance, the electric machine 10 may be configured to form an inner runner electric machine or an outer runner electric machine.

In certain embodiments, the brushless motor controller 1204 may be electrically coupled to the PCB power module 602 to form a power module assembly 606. In one embodiment, the power module assembly controller 606 may be designed to fit within an interior central cavity of the Halbach Array coil winding assembly 500 as illustrated in FIG. 1E2. In another embodiment, the Halbach Arrays of the rotor assemblies may provide shielding from electromagnetic interference when the power module assembly controller 606 is located inside the Halbach Array coil winding assembly 500. In yet another embodiment, the power module assembly controller 606 may be potted.

In some embodiments, the faces of the stator and rotor may be textured in such a manner as to provide more flux flow from localized areas of the pole faces and less flux flow from other areas of the pole faces so as to provide an evenly distributed torque force from each of the four rotor and stator faces regardless of the geometric shape or distance from the center of rotation of the rotor assemblies or longitudinal axis 101. In certain embodiments, the surface area of the stator poles of the stator core meant for magnetic flux flow may be textured to increase the air gap surface area.

In some embodiments, the first axial rotor assembly 220 and the Halbach Array coil winding assembly 500 are configured to minimize an airgap between the first axial rotor assembly 220 and the Halbach Array coil winding assembly 500. In certain embodiments, the axial rotor assembles 220 and 240, and the coil winding assembly 500 are configured to minimize the airgaps between the axial rotor assemblies 220 and 240, and the Halbach Array coil winding assembly 500. In some embodiments, the outer rotor assembly 230 and the Halbach Array coil winding assembly 500 are configured to minimize an airgap between the outer rotor assembly 230 and the Halbach Array coil winding assembly 500. In certain embodiments, the outer rotor assembly 230, the inner rotor assembly 210, and the Halbach Array coil winding assembly 500 are configured to minimize the airgaps between the outer rotor assembly 230 and the Halbach Array coil winding assembly 500 and between the inner rotor assembly 210 and the Halbach Array coil winding assembly 500.

In some embodiments, a Torque Tunnel Halbach Array Electric Machine (THEM) 200 may include a magnetic toroidal cylinder 100 having an inner rotor assembly 210, a first axial rotor assembly 220, and a second axial rotor assembly 240. Each of the rotor assemblies having a plurality of permanent magnets coupled to a associated rotor core, the permanent magnets arranged to form a plurality of flux Halbach Arrays configured to focus the Flux Density Distribution (FDD) within the magnetic toroidal cylinder. The first axial assembly 220 is attached at an inner edge to one end of the inner rotor assembly 210 and the second axial rotor assembly 240 is attached at an inner edge to the other end of the inner rotor assembly 210 thereby forming a three sided magnetic torque tunnel comprising at least a first magnetic pole tunnel segment and a second magnetic pole tunnel segment. A Halbach Array coil winding assembly 500 having a plurality of coils 526 is positioned within the magnetic toroidal cylinder. The Halbach Array coil winding assembly 500 is configured so that there is at least one coil 526 within each of the magnetic tunnel segments.

In certain embodiments, the magnetic toroidal cylinder 100 of the THEM 200 may further include an outer rotor assembly 230 having a plurality of permanent magnets coupled to and positioned about an outer rotor core 235, the permanent magnets arranged to form a plurality of flux shaping Halbach Arrays configured to focus the FDD within the magnetic toroidal cylinder. One end of the outer rotor assembly 230 is joined to an outer edge of the first axial rotor assembly 220 and the other end of the outer rotor assembly 230 is joined to an outer edge of the second axial rotor assembly 240 thereby forming a four sided magnetic torque tunnel having a plurality of magnetic pole segments. In one embodiment, the like magnetic poles of two or more of the rotor assemblies face each other and may also be substantially aligned. For instance, the magnetic poles of the outer Halbach Arrays and the inner Halbach Arrays may face each other and be substantially aligned.

In certain embodiments, there may be an airgap between the outer rotor assembly 230 and the Halbach Array coil winding assembly 500 and the outer rotor assembly 230 may be constructed to minimize this air gap in order to improve the performance of the THEM 200. There may also be an airgap between the Halbach Array coil winding assembly 500 and the first axial rotor assembly 220, and the first axial rotor assembly 220 may be constructed to minimize this air gap as well. The Halbach Array coil winding assembly 500 may be positioned about the central longitudinal axis of the THEM 200 within the path of the rotor core assembles which are adapted to rotate about the central longitudinal axis. In one embodiment, the outer rotor assembly may further define a transverse slot which allows a support for the Halbach Array coil winding assembly 500 to pass through the outer rotor assembly. In another embodiment, the transverse slot may be defined by the outer edge of the first axial rotor assembly and the first end of the outer rotor assembly.

In certain embodiments, the radial length of the inner face of the first axial rotor assembly 220 of the THEM 200 may be longer than the longitudinal length of an inner face of the inner rotor assembly 210. In other embodiments, the radial length of an inner face the first axial rotor assembly 220 may be shorter than the longitudinal length of an inner face of the inner rotor assembly 210. In one embodiment, the number of flux shaping Halbach Arrays in a radial portion of the inner rotor assembly 210 may be different from the number of flux shaping Halbach Arrays in a corresponding radial portion of the outer rotor assembly 230.

In certain embodiments, one or more of the Halbach Arrays may be configured from four permanent magnets having different magnetic orientations. In other embodiments, one or more of the Halbach Arrays may be configured from eight permanent magnets having different magnet orientations. In one embodiment, individual Halbach Arrays in a rotor assembly may be separated from adjacent Halbach Arrays by a spacer of ferromagnetic material, such that the permanent magnets of the Halbach Arrays comprise about 70% of a length of the magnetic torque tunnel and the ferromagnetic spacers form about 30% of the length of the magnetic torque tunnel.

In certain embodiments, one or more cores of the rotor assembles may be formed of laminated strips of grain-oriented electrical steel, which may be coated with an oxide layer, while in other embodiments one or more cores may be formed of an isotropic ferromagnetic material which may be a soft magnetic composite material. The isotropic material may also be a ferromagnetic open cell metal foam material infused with a structural support matrix made of thermoset or a thermoplastic resin having a porosity between about 75% and about 95% by volume.

In certain embodiments, the coil winding assembly may be configured as a single phase or polyphase coil winding assembly. In one embodiment, the coil winding assembly may be configured as a 3-phase coil winding assembly. For instance, the coil winding assembly may be configured as a 3-phase coil winding assembly having 16 coils in each phase. The 48 coils may be formed of copper wire. For instance, square copper wire of 1 Standard Wire Gauge. The 3-phase coil winding assembly may be positioned within a magnetic toroidal cylinder having a plurality of Halbach Arrays configured to form a plurality of magnetic poles. For instance, 46 magnetic poles or 23 pole pairs.

In some embodiments, a Torque Tunnel Halbach Array Electric Machine (THEM) 200 may include a magnetic toroidal cylinder 100 having an inner rotor assembly 210, a first axial rotor assembly 220, and an outer rotor assembly 230, and the core assemblies may comprise a plurality of Halbach Arrays configured to focus the Flux Density Distribution (FDD) within the magnetic toroidal cylinder. The first axial rotor assembly 220 is attached at an inner edge to a first end of the inner rotor assembly 210 and at an outer edge to a first end of the outer rotor assembly 230 thereby forming a three sided magnetic torque tunnel comprising at least a first magnetic pole tunnel segment and a second magnetic pole tunnel segment. A Halbach Array coil winding assembly 500 having a plurality of coils 526 is positioned within the magnetic toroidal cylinder 100. The Halbach Array coil winding assembly 500 is configured so that there is at least one coil 526 within each of the magnetic pole segments.

In certain embodiments, the magnetic toroidal cylinder 100 of the THEM 200 may further include a second axial rotor assembly 240 having a plurality of second axis permanent magnets positioned about and coupled to a second axial rotor core 245. The plurality of permanent magnets configured to form a plurality of flux shaping Halbach Arrays configured to focus the FDD in the magnetic toroidal cylinder. The second axial core is joined at an inner edge to the second end of the inner rotor assembly 210 and at the outer edge to the second end of the outer rotor assembly 230 thereby forming a four-sided magnetic torque tunnel having a plurality of magnetic tunnel segments. In one embodiment the longitudinal length of an inner face of the inner rotor assembly 210 is longer than a radial length of an inner face of the first axial rotor assembly 220.

In some embodiments, a Torque Tunnel Halbach Array Electric Machine (THEM) 200 may include a magnetic toroidal cylinder 100 having an inner rotor assembly 210, a first axial rotor assembly 220, a second axial rotor assembly 240, and an outer rotor assembly 230, and the rotor assemblies may comprise a plurality of permanent magnets positioned about and coupled to the rotor cores. The plurality of permanent magnets configured to form a plurality of flux shaping Halbach Arrays configured to focus the FDD within the magnetic toroidal cylinder 100.

The inner rotor assembly 210 is attached at one end to an inner edge of the first axial rotor assembly 220 and at the other end to the inner edge of the second axial rotor assembly 240, the outer rotor assembly 230 is attached at one end to an outer edge of the first axial rotor assembly 220 and at the other end to an outer edge of the second axial rotor assembly 240 thereby forming a magnetic torque tunnel. The outer rotor assembly 230 may further define a transverse slot which allows a support for a stator placed within the magnetic torque tunnel to pass through the outer rotor assembly 230. In certain embodiments, the outer edge of the first axial rotor assembly 220 and the first end of the outer rotor assembly 230 define the transverse slot.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

We claim:

1. A system for an electric motor comprising:
a stator comprising a set of coil assemblies arranged radially about a motor axis and defining:
an inner radial facet;
an outer radial facet;
a first axial facet; and
a second axial facet opposite the first axial facet;
a rotor comprising:
a set of inner radial magnetic elements arranged in a radial pattern about the inner radial facet of the stator and defining a first flux density distribution focused toward the inner radial facet;
a set of outer radial magnetic elements arranged in a radial pattern about the outer radial facet of the stator and defining a second flux density distribution focused toward the outer radial facet;
a first set of axial magnetic elements arranged in a radial pattern about the first axial facet of the stator and defining a third flux density distribution focused toward the first axial facet;
a second set of axial magnetic elements arranged in a radial pattern about the second axial facet of the stator and defining a fourth flux density distribution focused toward the second axial facet; and
a housing:
coupled to the rotor; and
comprising a shaft coaxial with the motor axis; and
a controller configured to drive current through the set of coil assemblies to generate a toroidal magnetic field tunnel configured to sequentially and magnetically couple the set of inner radial magnetic elements, the set of outer radial magnetic elements, the first set of axial magnetic elements, and the second set of axial magnetic elements.

2. The system of claim 1:
wherein the set of inner radial magnetic elements:
are arranged in a first Halbach array configuration about the inner radial facet of the stator; and
are coupled to an inner rotor core facing the inner radial facet of the stator; and
wherein the set of outer radial magnetic elements:
are arranged in a second Halbach array configuration, in alignment with the first Halbach array configuration, about the outer radial facet of the stator; and
are coupled to an outer rotor core, opposite the inner rotor core, facing the outer radial facet of the stator.

3. The system of claim 2, wherein the set of inner radial magnetic elements comprises:
a first inner radial magnetic element of a first magnetic pole orientation;
a second inner radial magnetic element of a second magnetic pole orientation, different from the first magnetic pole orientation, arranged adjacent the first inner radial magnetic element;
a third inner radial magnetic element:
of a third magnetic pole orientation different from the first magnetic pole orientation and the second magnetic pole orientation; and
arranged adjacent the second inner radial magnetic element and opposite the first inner radial magnetic element; and
a fourth inner radial magnetic element:
of a fourth magnetic pole orientation different from the first magnetic pole orientation, the second magnetic pole orientation, and the fourth magnetic pole orientation;
arranged adjacent the third inner radial magnetic element, opposite the first inner radial magnetic element and the second inner radial magnetic element; and
cooperating with the first inner magnetic element, the second inner magnetic element, the third inner magnetic element, and the fourth inner magnetic element to define a first magnetic pole tunnel segment of the rotor.

4. The system of claim 2:
wherein the first set of axial magnetic elements:
are arranged in a third Halbach array configuration about the first axial facet of the stator; and
are coupled to a first axial rotor core facing the first axial facet of the stator;
wherein the second set of axial magnetic elements:
are arranged in a fourth Halbach array configuration, in alignment with the third Halbach array configuration, about the second axial facet of the stator; and
are coupled to a second axial rotor core, opposite the first axial rotor core, facing the second axial facet of the stator; and
wherein set of inner radial magnetic elements, the set of outer radial magnetic elements, the first set of axial magnetic elements, and the second set of axial magnetic elements cooperate to form a magnetic flux tunnel enveloping the set of coil assemblies.

5. The system of claim 1, wherein each coil assembly, in the set of coil assemblies comprises:
a first pole portion defining a first aperture;
a second pole portion:
defining a second aperture in alignment with the first aperture; and
arranged opposite the first pole portion;
a first bobbin:
interposed between the first pole portion and the second pole portion;
defining a third aperture in alignment with the first aperture and the second aperture to define a pole tunnel segment; and
defining a winding receiving slot about an exterior of the first bobbin;
a first winding coiled about the winding receiving slot of the first bobbin and comprising a first set of leads; and
a first set of PCB connectors coupled to the first set of leads of the first winding and extending from an inner radial facet of the first bobbin.

6. The system of claim 5, wherein the stator further comprises a ring core arranged radially about the motor axis and positioned within the pole tunnel segment for each coil assembly, in the set of coil assemblies.

7. The system of claim 1:
wherein the rotor further comprises an inner rotor core comprising:
an inner radial sidewall extending across the inner radial facet of the stator; and
a first axial sidewall:
coupled to the inner radial sidewall;
arranged normal the inner radial sidewall; and
extending across the first axial facet of the stator;
wherein the set of inner radial magnetic element are arranged about the inner radial sidewall of the inner rotor core and facing the inner radial facet of the stator;

wherein the first set of axial magnetic elements are arranged about the first axial sidewall of the inner rotor core and facing the first axial facet of the stator; and wherein the shaft is rigidly coupled to the inner rotor core.

8. The system of claim 7:

wherein the rotor further comprises an outer rotor core comprising:
an outer radial sidewall extending across the outer radial facet of the stator; and
a second axial sidewall, opposite the first axial sidewall:
coupled to the outer radial sidewall;
arranged normal the outer radial sidewall; and
extending across the second axial facet of the stator;

wherein the set of outer radial magnetic elements are arranged about the outer radial sidewall of the outer rotor core and facing the outer radial facet of the stator;

wherein the second set of axial magnetic elements are arranged about the second axial sidewall of the outer rotor core and facing the second axial facet of the stator; and wherein the shaft is rigidly coupled to the outer rotor core.

9. The system of claim 1:

wherein the set of inner radial magnetic elements extend partially across the inner radial facet of the stator to define a radial slot about the inner radial facet;

wherein the housing further comprises a stator element:
positioned within the radial slot of the set of inner radial magnetic elements;
coupled to the set of coil assemblies; and
comprising a first bearing centrally arranged at the stator element in alignment with the motor axis; and wherein the shaft:
extends through the stator element in alignment with the motor axis; and
is coupled to the first bearing of the stator element.

10. The system of claim 9:

wherein each coil assembly, in the set of coil assemblies comprises a receiving slot arranged at an inner radial facet of the coil assembly, the receiving slot exposing the receiving slot; and wherein the stator element comprises a set of radial arms, each radial arm in the set of radial arms coupled to the receiving slot of each coil assembly, in the set of coil assemblies.

11. The system of claim 1, wherein the set of coil assemblies comprises:
a first subset of coil assemblies defining a first phase winding for the electric motor and comprising:
a first set of bobbins arranged radially about the motor axis;
a first set of windings wound about the first set of bobbins; and
a first set of leads coupled to the controller;
a second subset of coil assemblies defining a second phase winding, different from the first phase winding, of the electric motor and comprising:
a second set of bobbins arranged radially about the motor axis adjacent the first set of bobbins;
a second set of windings wound about the second set of bobbins; and
a second set of leads coupled to the controller;
a third subset of coil assemblies:
defining a third phase winding, different from the first phase winding and the second phase winding, of the electric motor;
comprising:
a third set of bobbins arranged radially about the motor axis adjacent the first set of bobbins and the second set of bobbins;
a third set of windings wound about the third set of bobbins; and
a third set of leads coupled to the controller; and
cooperating with the first subset of coil assemblies, the second subset of coil assemblies, and the third subset of coil assemblies to define a 3-phase configuration for the electric motor.

12. The system of claim 1:

wherein the stator further comprises:
a first core segment extending radially about the motor axis; and
a second core segment:
coupled at a first end and a second end of the first core segment;
extending radially about the motor axis; and
cooperating with the first core segment to define a circular central core of the stator; and wherein the set of coil assemblies comprises:
a first subset of coil assemblies comprising a first subset of windings coiled about a first subset of bobbins, the first subset of bobbins defining a first tunnel segment configured to receive the first core segment; and
a second subset of coil assemblies comprising a second subset of windings coiled about a second subset of bobbins, the second subset of bobbins defining a second tunnel segment configured to receive the second core segment.

13. A system for an electric motor comprising:
a set of coil assemblies:
arranged radial about a motor axis;
defining an inner radial facet, an outer radial facet, a first axial facet, and a second axial facet opposite the first axial facet; and
each coil assembly in the set of coil assemblies comprising a receiving slot;
a magnetic tunnel encompassing the set of coil assemblies:
comprising:
a set of inner radial magnetic elements arranged in a radial pattern about the inner radial facet of the set of coil assemblies;
a set of outer radial magnetic elements arranged in a radial pattern about the outer radial facet of the set of coil assemblies;
a first set of axial magnetic elements arranged in a radial pattern about the first axial facet of the set of coil assemblies; and
a second set of axial magnetic elements arranged in a radial pattern about the second axial facet of the set of coil assemblies; and
configured to generate a flux density distribution focused toward the set of coil assemblies; and
a housing:
containing the set of coil assemblies and the magnetic tunnel;
comprising a set of latching members coupled to the receiving slot of each coil assembly, in the set of coil assemblies; and
comprising a shaft coaxial with the motor axis.

14. The system of claim 13:

wherein the set of inner radial magnetic elements:
are arranged in a first Halbach array configuration about the inner radial facet of the set of coil assemblies; and are coupled to an inner rotor core facing the inner radial facet of the set of coil assemblies; and wherein the set of outer radial magnetic elements:
are arranged in a second Halbach array configuration, in alignment with the first Halbach array configuration, about the outer radial facet of the set of coil assemblies; and
are coupled to an outer rotor core, opposite the inner rotor core, facing the outer radial facet of the set of coil assemblies.

15. The system of claim 13:
wherein the first set of axial magnetic elements:
are arranged in a third Halbach array configuration about the first axial facet of the set of coil assemblies; and
are coupled to a first axial rotor core facing the first axial facet of the set of coil assemblies;
wherein the second set of axial magnetic elements:
are arranged in a fourth Halbach array configuration, in alignment with the third Halbach array configuration, about the second axial facet of the set of coil assemblies; and
are coupled to a second axial rotor core, opposite the first axial rotor core, facing the second axial facet of the set of coil assemblies; and
wherein set of inner radial magnetic elements, the set of outer radial magnetic elements, the first set of axial magnetic elements, and the second set of axial magnetic elements cooperate to form a magnetic flux tunnel enveloping the set of coil assemblies.

16. The system of claim 13:
wherein the set of inner radial magnetic elements extend partially across the inner radial facet of the set of coil assemblies to define a radial slot;
wherein the housing further comprises a stator element:
positioned within the radial slot of the set of inner radial magnetic elements;
coupled to the set of coil assemblies;
comprising a set of radial arms, each radial arm in the set of radial arms coupled to the receiving slot of each coil assembly, in the set of coil assemblies; and
comprising a first bearing centrally arranged at the stator element in alignment with the motor axis; and
wherein the shaft:
extends through the stator element in alignment with the motor axis; and
is coupled to the first bearing of the stator element.

17. A system for an electric motor comprising:
a set of coil assemblies:
arranged radial about a motor axis;
defining an inner radial facet, an outer radial facet, a first axial facet, and a second axial facet opposite the first axial facet; and
each coil assembly in the set of coil assemblies comprising a receiving slot;
a magnetic tunnel encompassing the set of coil assemblies:
comprising:
a set of inner radial magnetic elements arranged in a first Halbach array configuration about the inner radial facet of the set of coil assemblies;
a set of outer radial magnetic elements arranged in a second Halbach array configuration, in alignment with the first Halbach array configuration, about the outer radial facet of the set of coil assemblies;
configured to generate a flux density distribution focused toward the set of coil assemblies; and
a housing:
containing the set of coil assemblies and the magnetic tunnel;
comprising a set of latching members coupled to the receiving slot of each coil assembly, in the set of coil assemblies; and
comprising a shaft coaxial with the motor axis.

18. The system of claim 17, wherein the magnetic tunnel further comprises:
a first set of axial magnetic elements arranged in a third Halbach array configuration about the first axial facet of the set of coil assemblies; and
a second set of axial magnetic elements arranged in a fourth Halbach array configuration, in alignment with the third Halbach array configuration, about the second axial facet of the set of coil assemblies.

19. The system of claim 17:
wherein the rotor further comprises an inner rotor core comprising:
an inner radial sidewall extending across the inner radial facet of the set of coil assemblies; and
a first axial sidewall:
coupled to the inner radial sidewall;
arranged normal the inner radial sidewall; and
extending across the first axial facet of the set coil assemblies;
wherein the set of inner radial magnetic element are arranged about the inner radial sidewall of the inner rotor core and facing the inner radial facet of the set of coil assemblies;
wherein the first set of axial magnetic elements are arranged about the first axial sidewall of the inner rotor core and facing the first axial facet of the set of coil assemblies; and
wherein the shaft is rigidly coupled to the inner rotor core.

20. The system of claim 17:
wherein the set of inner radial magnetic elements extend partially across the inner radial facet of the set of coil assemblies to define a radial slot;
wherein the housing further comprises a stator element:
positioned within the radial slot of the set of inner radial magnetic elements;
coupled to the set of coil assemblies;
comprising a set of radial arms, each radial arm in the set of radial arms coupled to the receiving slot of each coil assembly, in the set of coil assemblies; and
comprising a first bearing centrally arranged at the stator element in alignment with the motor axis; and
wherein the shaft:
extends through the stator element in alignment with the motor axis; and
is coupled to the first bearing of the stator element.

* * * * *